(12) United States Patent
Yasui et al.

(10) Patent No.: US 11,826,759 B2
(45) Date of Patent: *Nov. 28, 2023

(54) AUTOMATED ANALYSIS DEVICE

(71) Applicant: Hitachi High-Tech Corporation, Tokyo (JP)

(72) Inventors: Akihiro Yasui, Tokyo (JP); Akihisa Makino, Tokyo (JP); Masashi Akutsu, Tokyo (JP); Hiroyuki Mishima, Tokyo (JP); Yoshihiro Suzuki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 17/555,764

(22) Filed: Dec. 20, 2021

(65) Prior Publication Data

US 2022/0111391 A1 Apr. 14, 2022

Related U.S. Application Data

(63) Continuation of application No. 16/918,858, filed on Jul. 1, 2020, now Pat. No. 11,235,334, which is a
(Continued)

(30) Foreign Application Priority Data

Mar. 14, 2017 (JP) ................. 2017-048206

(51) Int. Cl.
*B01L 9/00* (2006.01)
*G01N 35/00* (2006.01)
(Continued)

(52) U.S. Cl.
CPC ................. *B01L 9/00* (2013.01); *B01L 13/02* (2019.08); *G01N 35/00584* (2013.01);
(Continued)

(58) Field of Classification Search
CPC ...... G01N 35/04; G01N 35/02; G01N 35/025; G01N 2035/00534; G01N 2035/0094;
(Continued)

(56) References Cited

U.S. PATENT DOCUMENTS 5,679,309 A * 10/1997 Bell ..................... G01N 35/025
422/547
5,741,461 A * 4/1998 Takahashi ........ G01N 35/00594
422/64

(Continued)

FOREIGN PATENT DOCUMENTS

EP 2573572 A1 3/2013
JP H05164763 A 6/1993
(Continued)

OTHER PUBLICATIONS

International Search Report dated Jun. 12, 2018 in corresponding International Applicatin No. PCT/JP2018/008955.
(Continued)

*Primary Examiner* — Shogo Sasaki
(74) *Attorney, Agent, or Firm* — Miles & Stockbridge, PC

(57) ABSTRACT

Provided is an automated analysis device with which sufficient reaction process data can be acquired irrespective of the scale of the device, and with which it is possible to ensure freedom of the device configuration. An automated analysis device 100 is provided with: a reaction disk 1 which circumferentially accommodates a plurality of reaction vessels 2; a specimen dispensing mechanism 11 which dispenses a specimen into the reaction vessels 2; a reagent dispensing mechanism 7 which dispenses a reagent into the reaction vessels 2; a measuring unit 4 which measures a reaction process of a mixture of the specimen and the reagent in the reaction vessels 2; and a cleaning mechanism 3 which cleans the reaction vessels 2 after measurement.
(Continued)

Further, the automated analysis device 100 includes a controller 21 which controls the drive of the reaction disk 1 such that in one cycle the reaction vessels 2 move by an amount A in the circumferential direction in such a way that N and A are mutually prime, B and C are mutually prime, and the relationship $A \times B = N \times C \pm 1$ holds, where N is the total number of reaction vessels 2 accommodated in the reaction disk 1, the reaction disk 1 moves through C (where $C > 1$) rotations+an amount equivalent to one reaction vessel after B (where $B > 2$) cycles, and the number of reaction vessels 2 moved in one cycle is A (where $N > A > N/B + 1$).

10 Claims, 11 Drawing Sheets

Related U.S. Application Data continuation of application No. 16/487,029, filed as application No. PCT/JP2018/008955 on Mar. 8, 2018, now Pat. No. 10,717,087.

(51) Int. Cl.
*G01N 35/02* (2006.01)
*G01N 35/10* (2006.01)

(52) U.S. Cl.
CPC ....... *G01N 35/026* (2013.01); *G01N 35/1002* (2013.01); *G01N 35/1004* (2013.01); *B01L 2200/143* (2013.01); *B01L 2200/16* (2013.01); *B01L 2200/18* (2013.01); *B01L 2300/0663* (2013.01); *B01L 2300/0803* (2013.01)

(58) Field of Classification Search
CPC ... G01N 2035/0453; G01N 2035/1076; G01N 2035/1088; G01N 2035/1032; Y10T 436/11
See application file for complete search history.

(56) References Cited

U.S. PATENT DOCUMENTS

| | | | |
|---|---|---|---|
| 5,773,662 A | 6/1998 | Imai et al. | |
| 5,876,668 A * | 3/1999 | Kawashima | G01N 35/025 422/63 |
| 6,146,592 A | 11/2000 | Kawashima et al. | |
| 7,998,751 B2 * | 8/2011 | Evers | B01F 11/0071 422/500 |
| 2009/0104704 A1 | 4/2009 | Wang et al. | |
| 2013/0108508 A1 | 5/2013 | Takahashi et al. | |

FOREIGN PATENT DOCUMENTS

| | | |
|---|---|---|
| JP | H09072918 A | 3/1997 |
| JP | H10062429 A | 3/1998 |
| JP | 2000321285 A | 11/2000 |
| JP | 2006084211 A | 3/2006 |
| JP | 201720893 A | 1/2017 |

OTHER PUBLICATIONS

International Preliminary Report on Patenablity dated Sep. 14, 2019 in corresponding International Applicatin No. PCT/JP2018/008955.
Non-Final Office Action dated Dec. 11, 2019 in U.S. Appl. No. 16/487,029.
Notice of Allowance dated Mar. 18, 2020 in corresponding U.S. Appl. No. 16/487,029.
Search Report dated Nov. 25, 2020 in corresponding European Application No. 18767506.1.

* cited by examiner

[FIG 1]
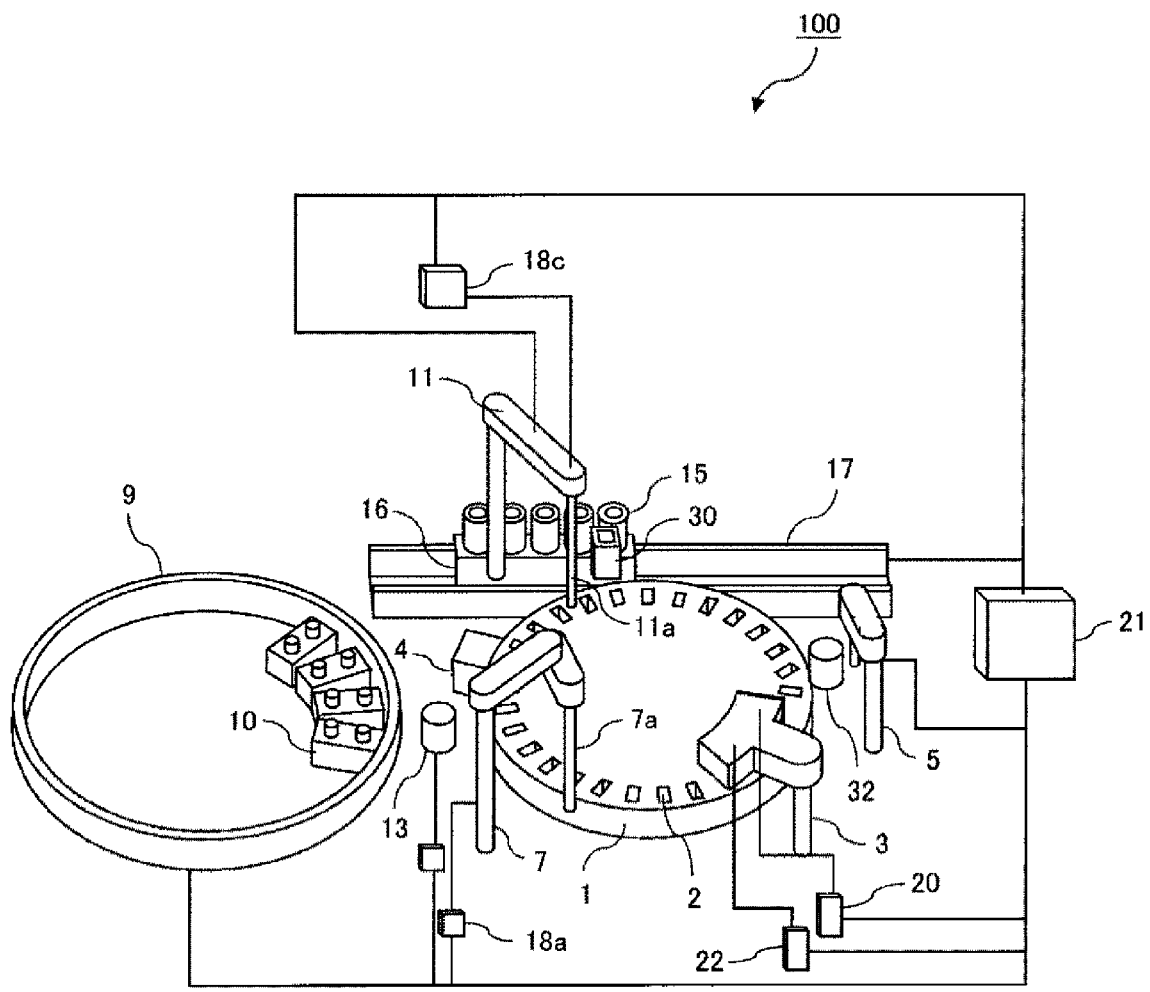

[FIG. 2]
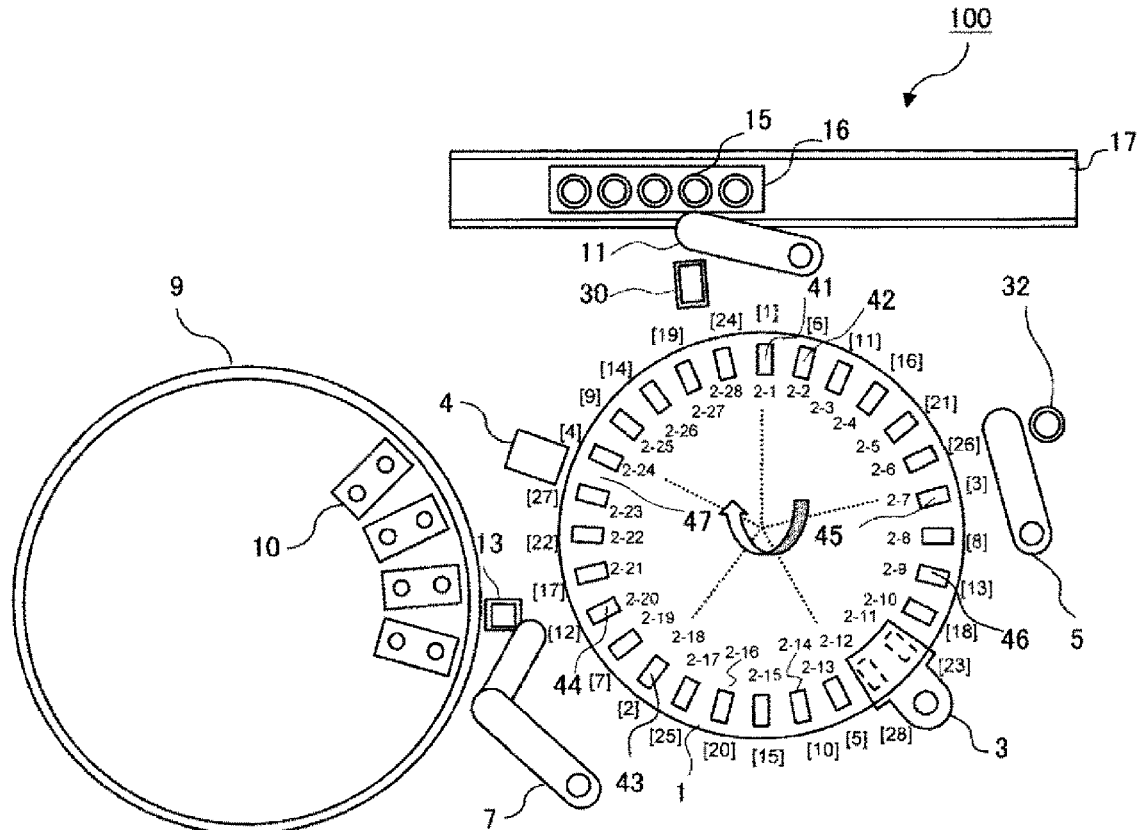
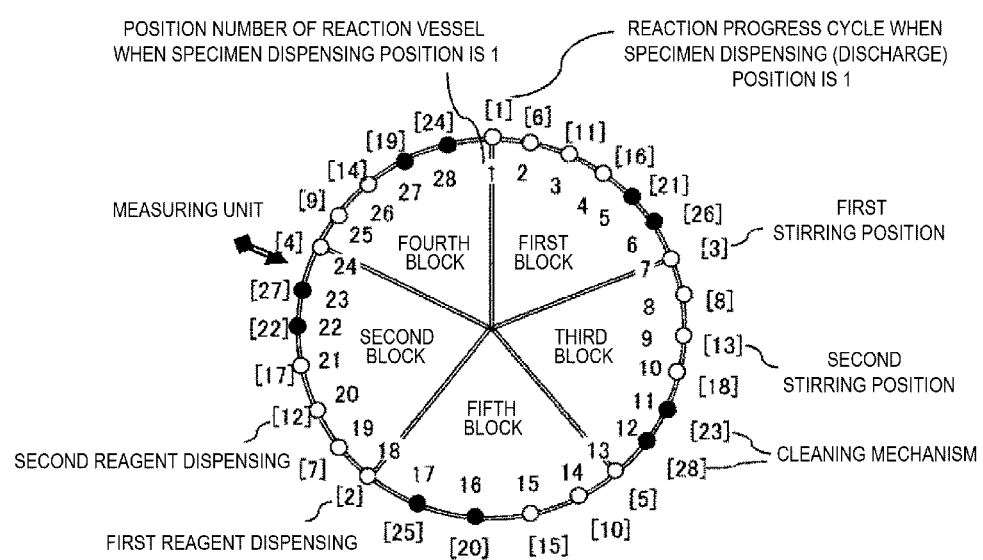

[FIG. 3]
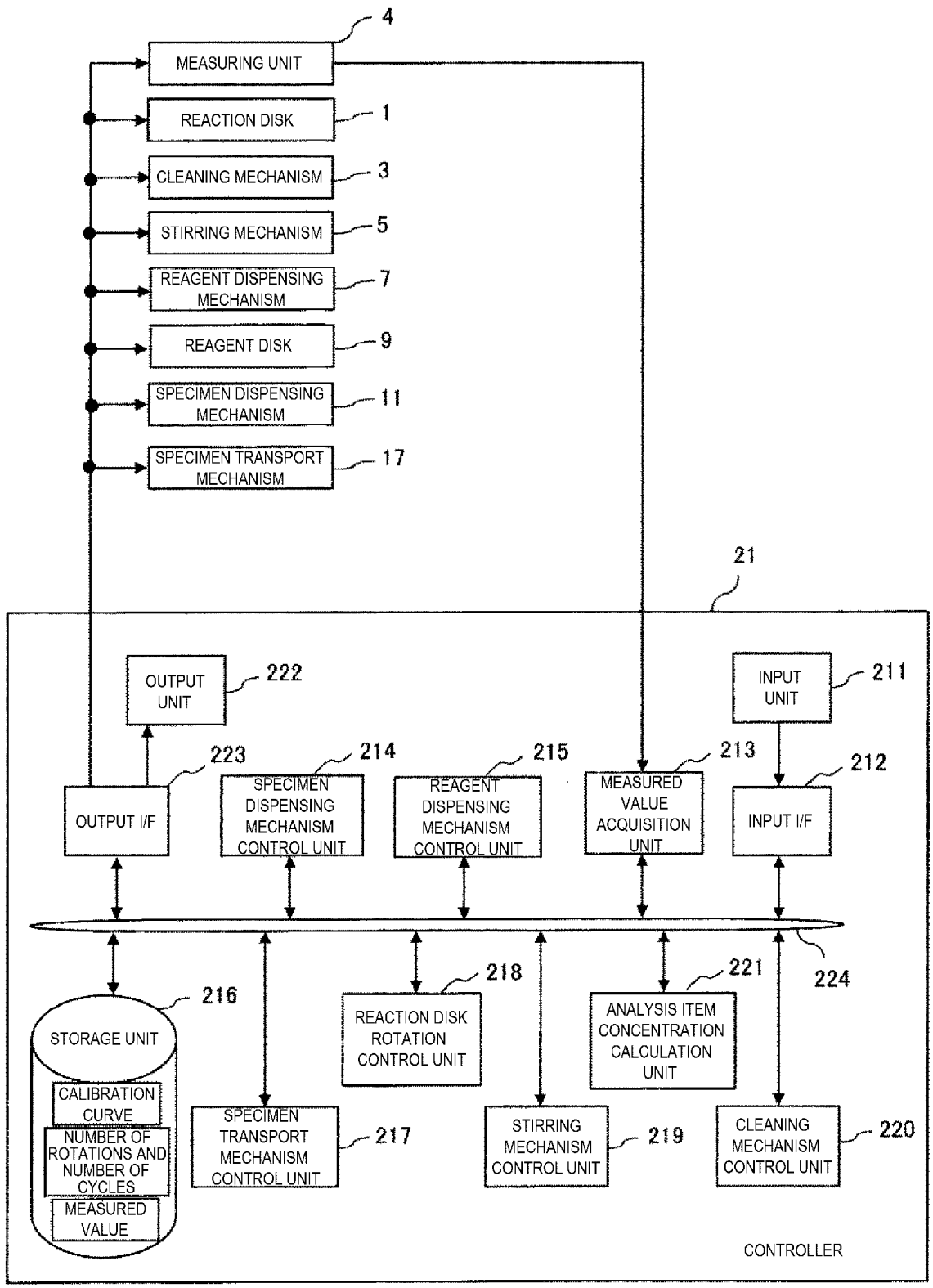

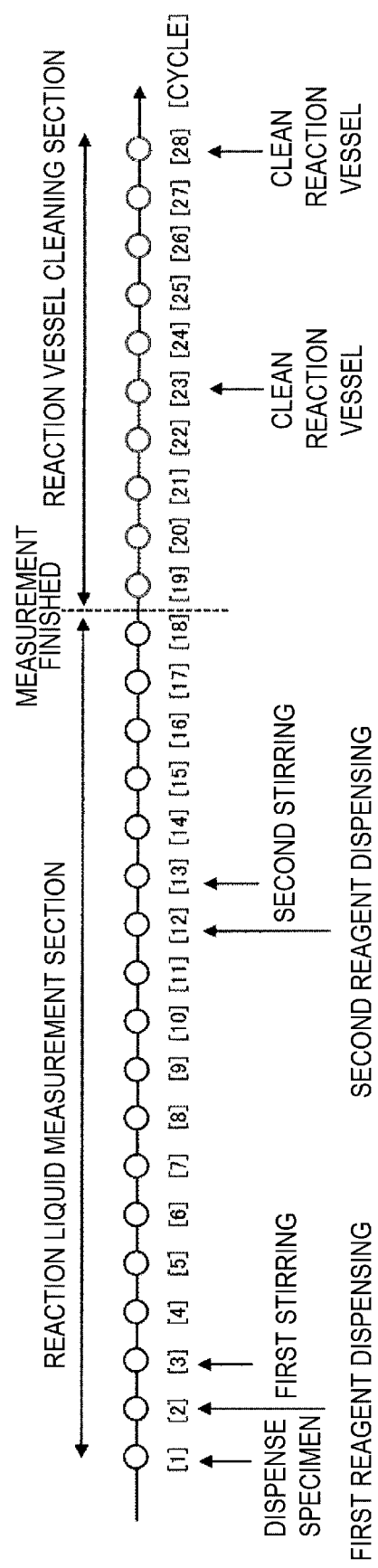
[FIG. 4]

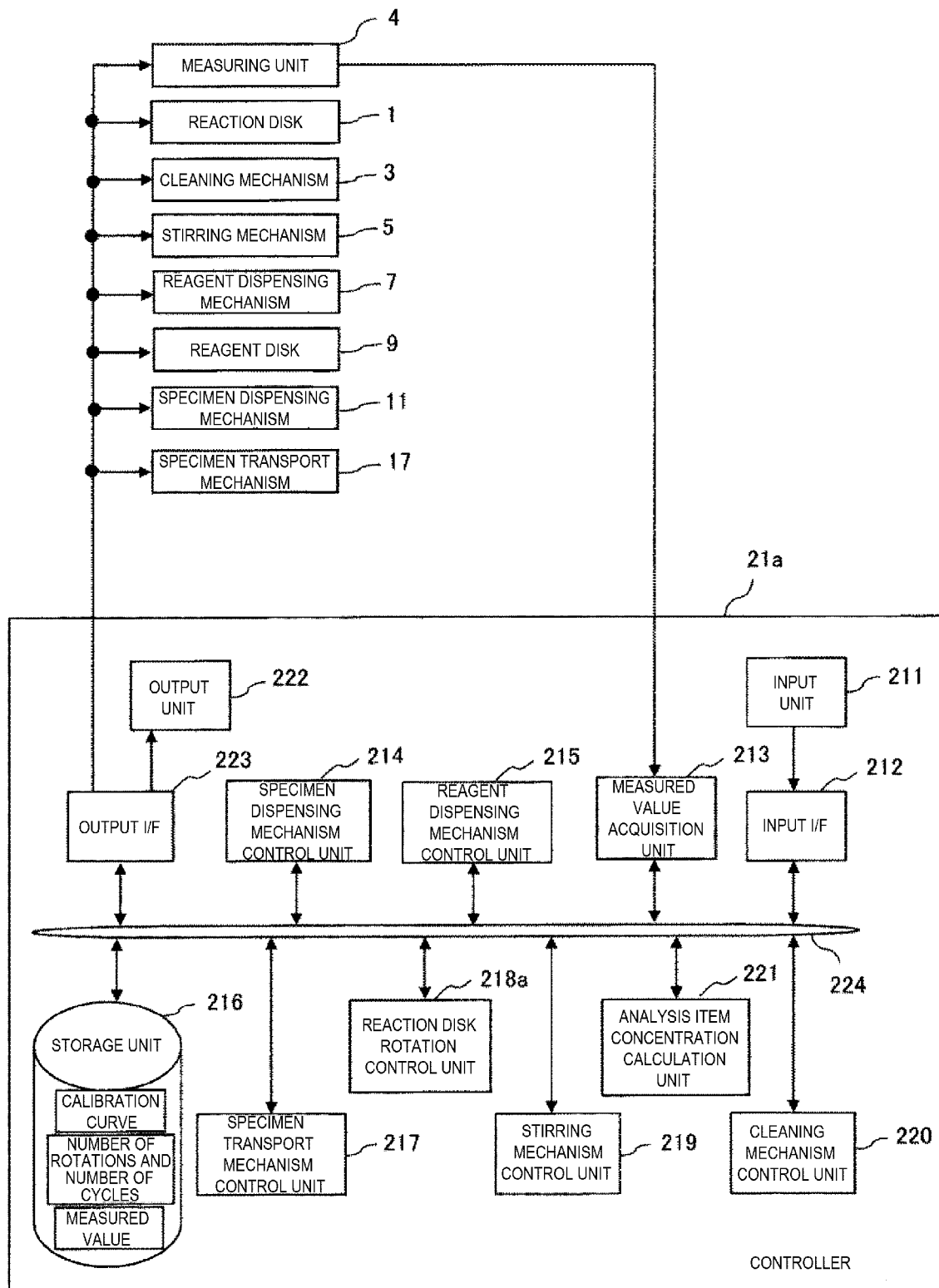
[FIG. 5]

[FIG. 6]
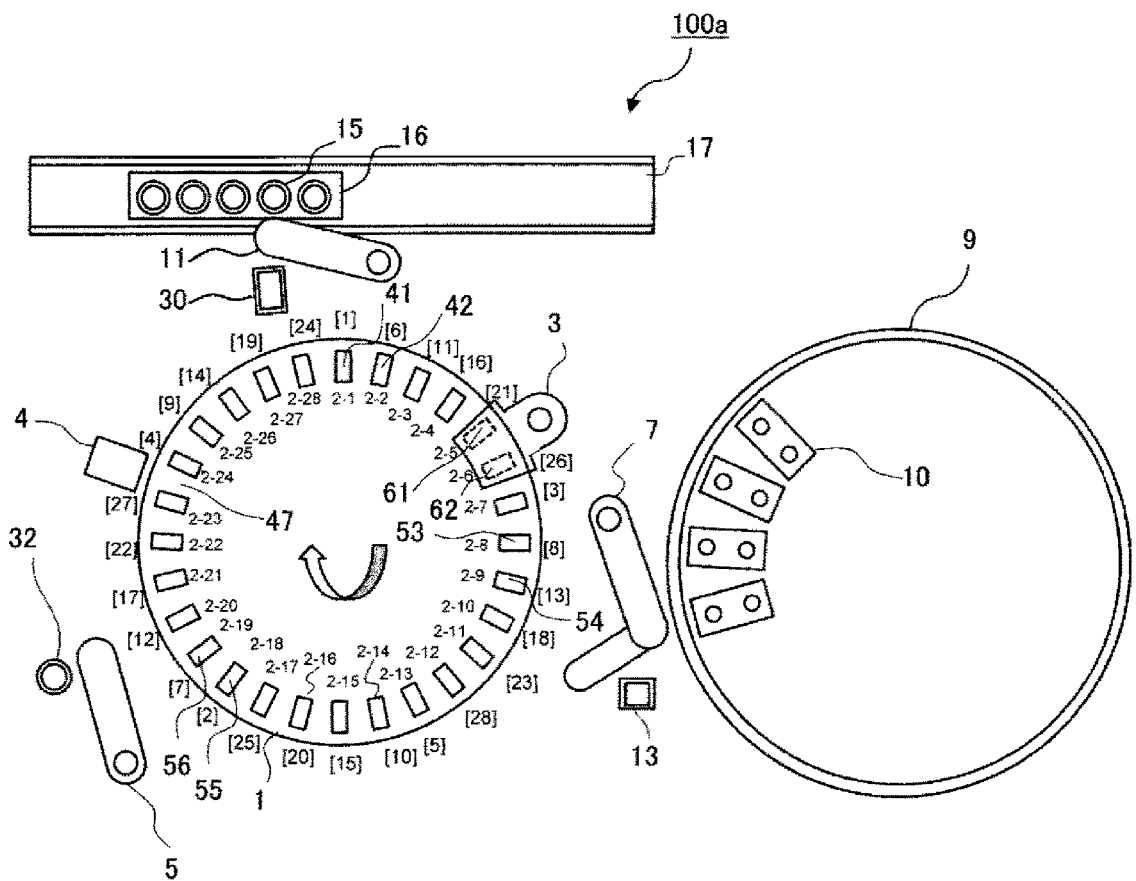
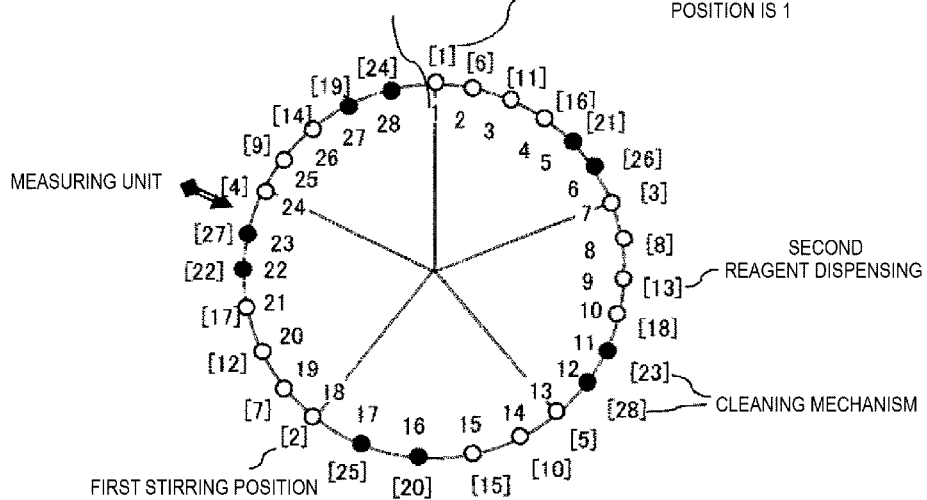

[FIG 7]
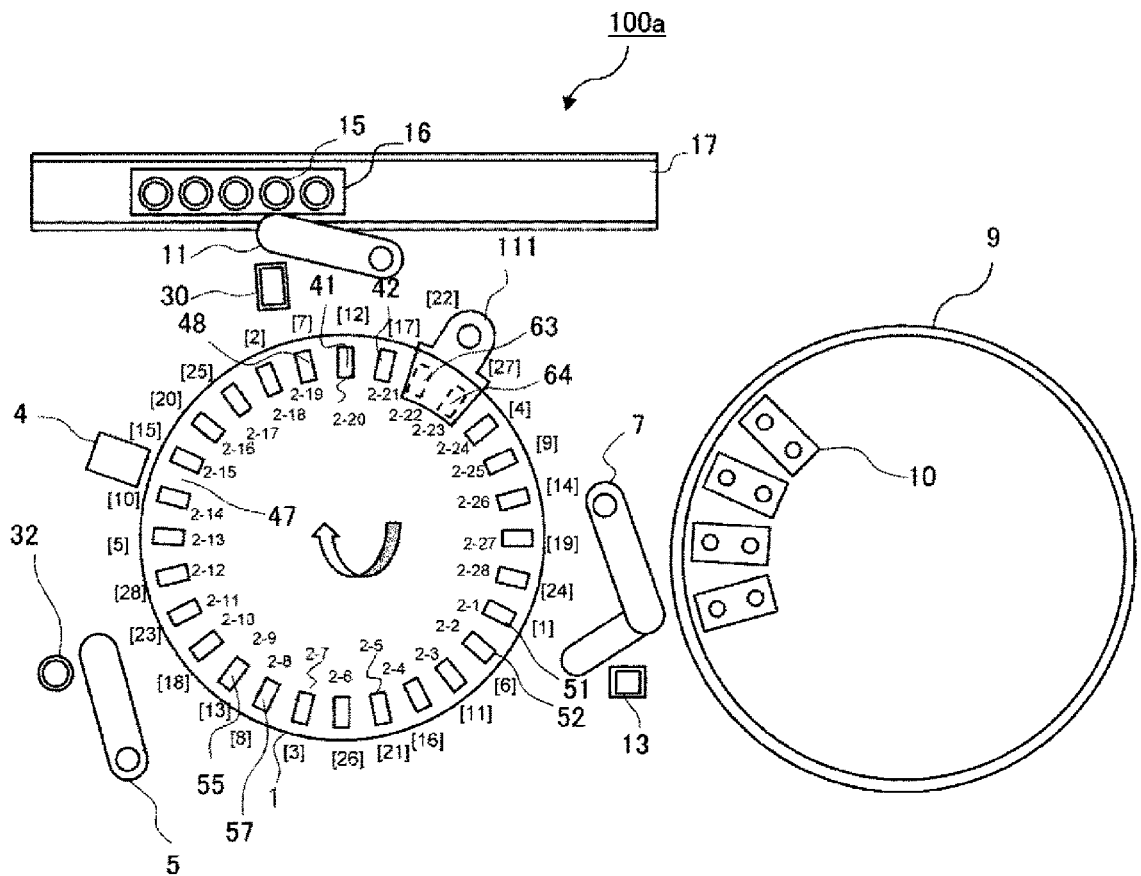
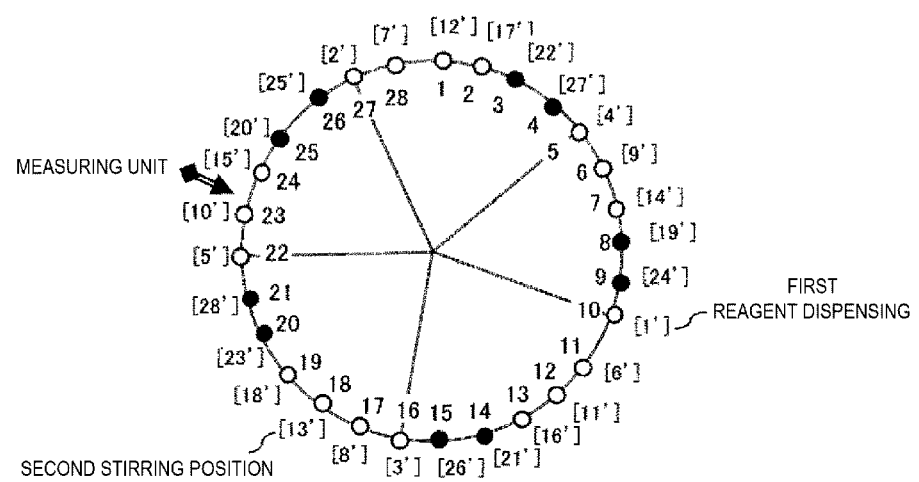

[FIG. 8]
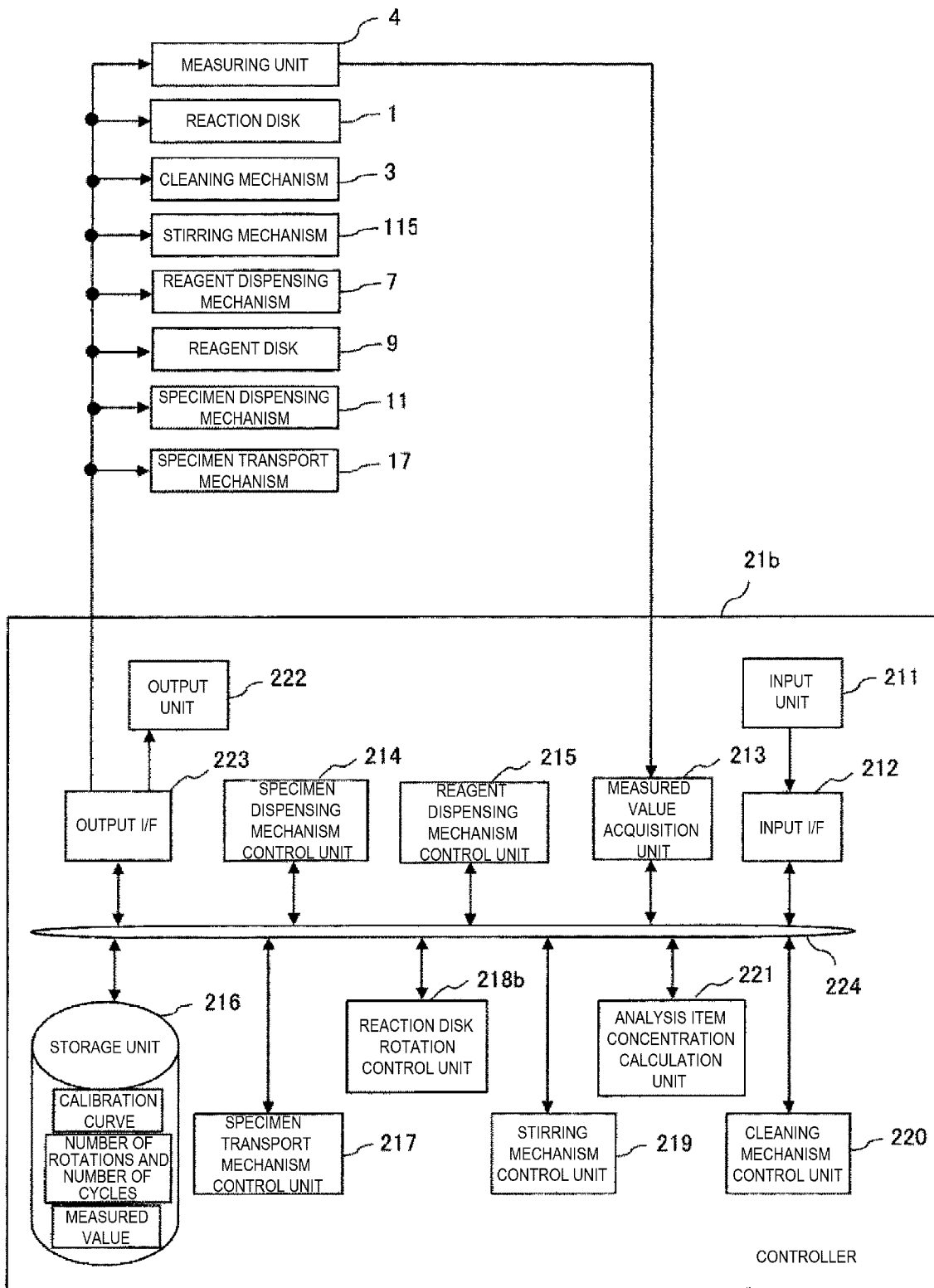

[FIG. 9]
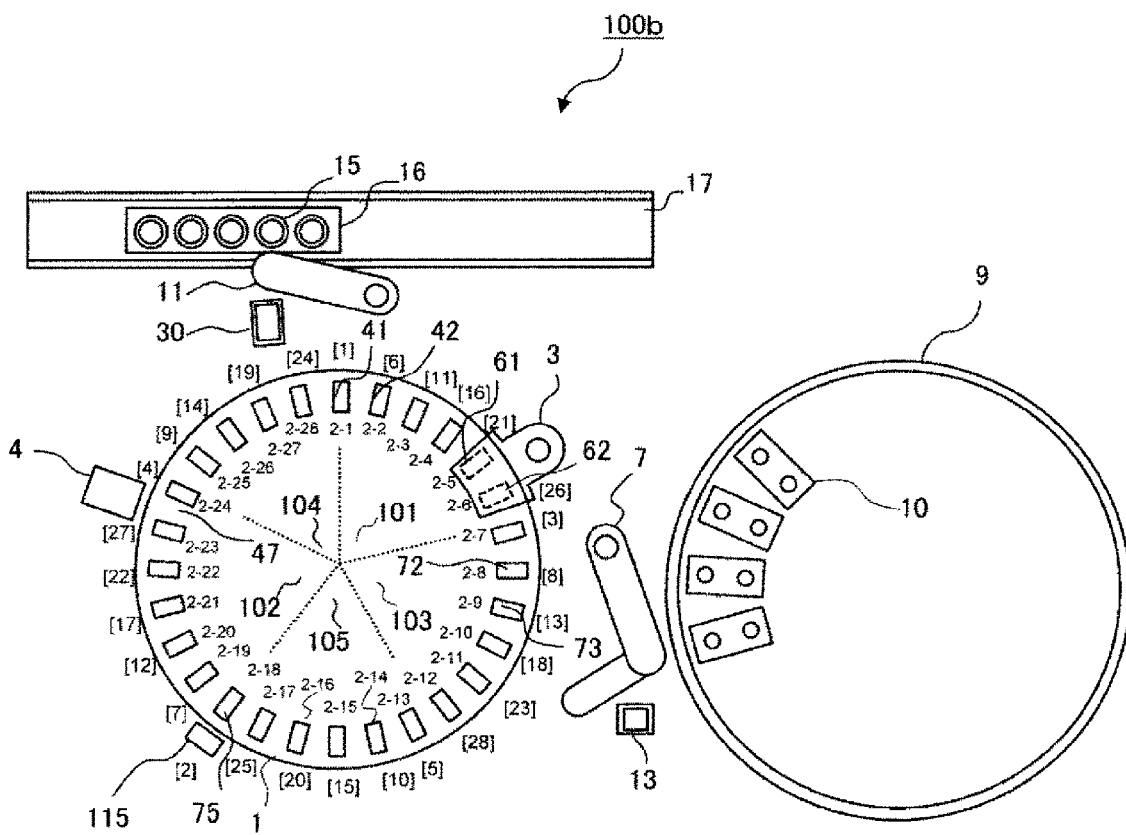

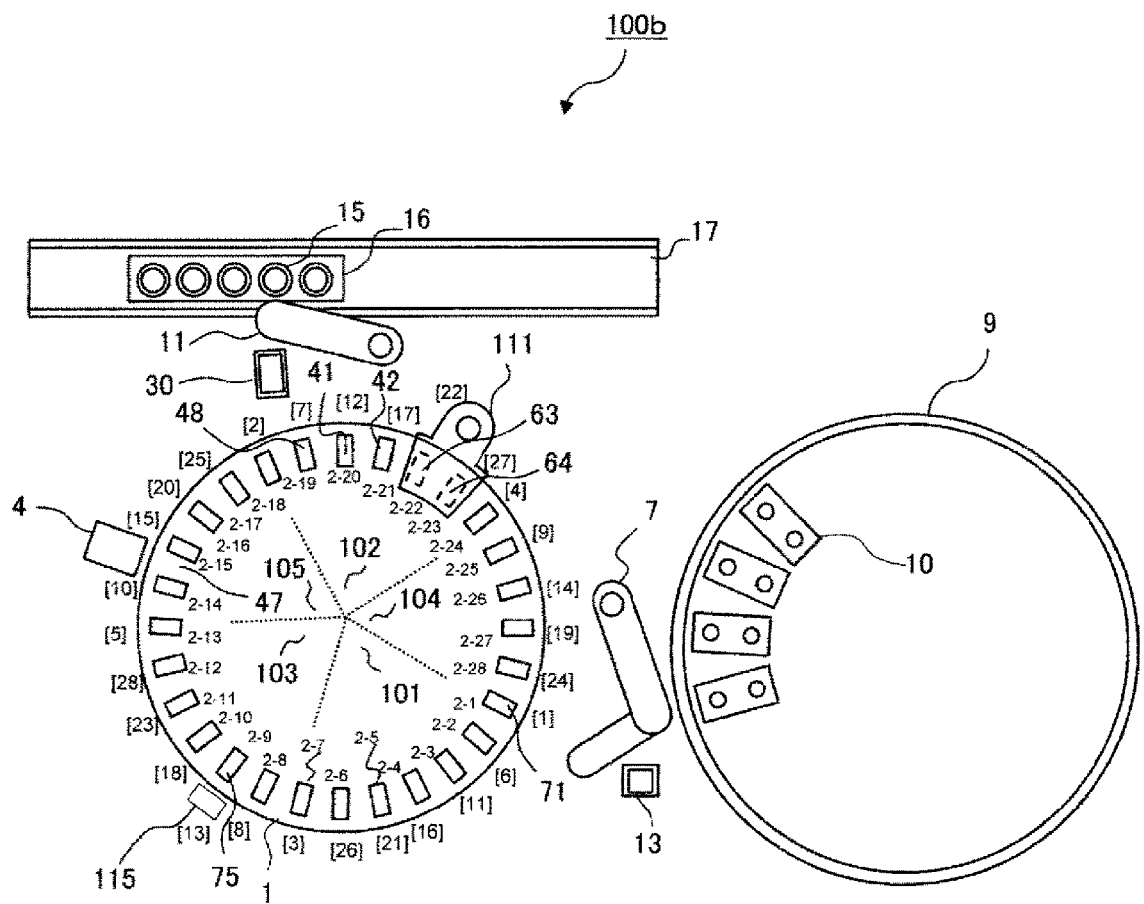
[FIG. 10]

[FIG. 11]
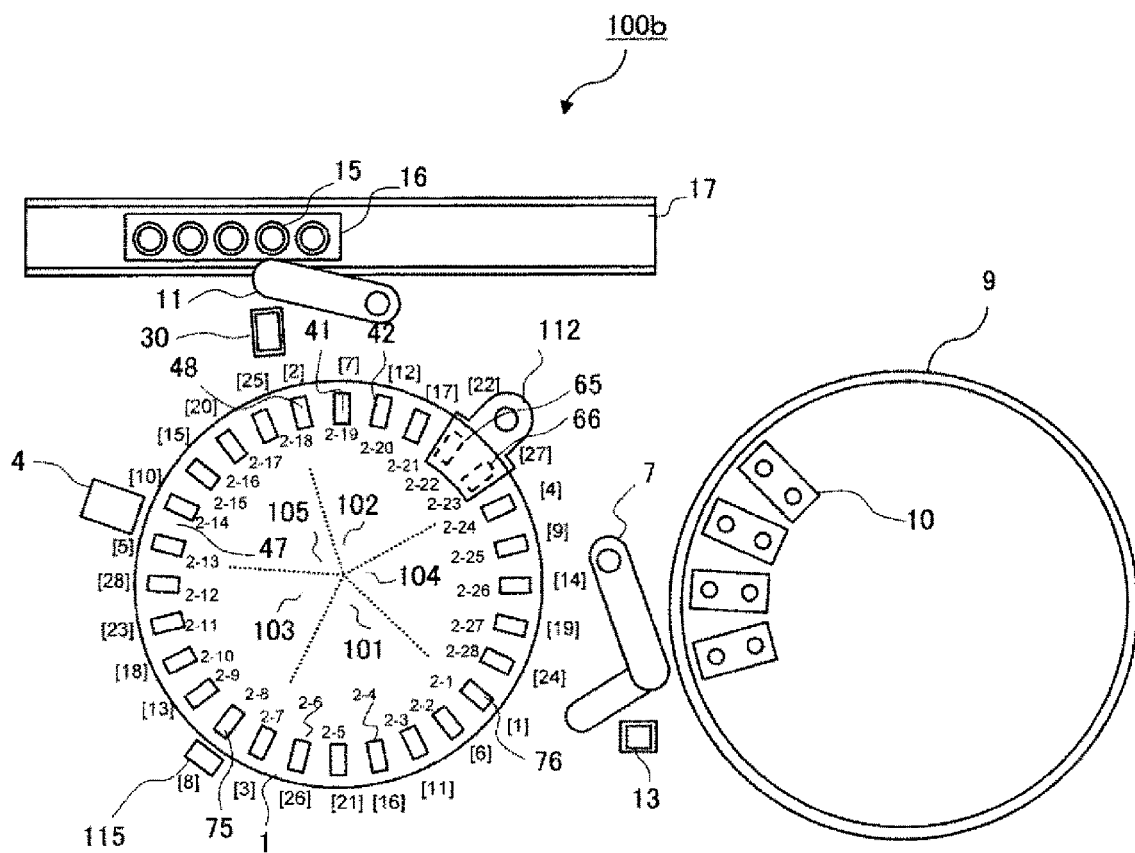

AUTOMATED ANALYSIS DEVICE

TECHNICAL FIELD

The present invention relates to an automatic analysis device which analyzes biological specimens such as blood and urine.

BACKGROUND ART

An automatic analysis device which performs quantitative analysis or qualitative analysis of specific components included in biological specimens such as blood and urine is indispensable for the present diagnosis because of the reproducibility of the analysis results and the high processing speed.

A measurement method of the automatic analysis device is roughly classified into an analysis method (colorimetric analysis) using a reagent which reacts with a component to be analyzed in a specimen and changes the color of a reaction liquid, and an analysis method (immune analysis) using a reagent in which a marker is added to a substance which specifically binds to a target component directly or indirectly to count the marker.

In general, the automatic analysis device which performs the colorimetric analysis is configured such that a plurality of reaction vessels arranged in an annular shape on a rotatable disk are repeatedly rotated and stopped, and a reaction between the reagent and the biological specimens such as blood and urine is continuously and cyclically analyzed.

The definition of cycle time in an automatic analysis device generally refers to the time from dispensing a specimen for measurement in one reaction vessel to dispensing a specimen in the next reaction vessel.

For example, Patent Literature 1 discloses an automatic analysis device in which reaction detection tubes are repeatedly moved and all of the reaction detection tubes are used sequentially for analysis, and $N\pm1=A\times M$ (A is an integer of 2 or more) is satisfied, where N is the number of a plurality of reaction detection tubes arranged circumferentially in a rotary table, M is the number of the reaction detection tubes moved in one analysis cycle, there is no common factor other than 1 between N and M, and $M<N/2$ is satisfied. Specifically, when $N=15$, $A=4$, and $M=4$, the rotary table moves by one circle+an amount equivalent to one reaction detection tube after four analysis cycles. In this way, by moving the rotary table by one circle+the amount equivalent to one reaction detection tube through a plurality of cycles, specimens can be dispensed to the reaction detection tubes for a plurality of times during the moving, so that the number of specimens which can be analyzed per unit time can be improved without increasing a rotation speed of the rotary table. However, as a result, reaction detection tubes moved by one circle of the rotary table+the amount equivalent to one reaction detection tube from an original position after the plurality of cycles, so that in the example in which the rotary table moves by one circle+the amount equivalent to one reaction detection tube after four analysis cycles where $N=15$, $A=4$, and $M=4$, any one of the reaction detection tubes is positioned at a specimen discharge (dispensing) position after measurement and cleaning after 4 analysis cycles×15 reaction detection tubes=60 analysis cycles. That is, the process necessary for the change in absorbance of the reaction liquid may not be obtained when the reaction detection tube can be measured by a light detector only once every four analysis cycles, but by performing a first reagent dispensing after moving one analysis cycle from the specimen dispensing, the reagent can be dispensed to a position adjacent to a first reagent dispensing position, that is, to the reaction detection tube after four analysis cycles from the first reagent dispensing, so that the first reagent dispensing position and a mechanism related thereto are separated from the specimen dispensing position, and the time for stopping the reaction detection tubes in one cycle can be shortened. Also, cleaning positions of the reaction detection tubes appear to be dispersedly and adjacent to the reaction detection tubes whose reaction liquid is measured and can be cleaned after analysis cycles necessary for the rotary table to move by 1 circle+the amount equivalent to 1 reaction detection tube, so that the freedom of the configuration of the cleaning mechanism can be ensured.

Patent Literature 2 discloses an automatic analysis device configured such that a first reagent injection position and a second injection position are set to be adjacent to each other; a first stirring position and a second stirring position, at which a reaction liquid which is a mixture of the specimen and the reagent is stirred, are set to be adjacent to each other; and a stirring device is provided to be movable between the first stirring position and the second stirring position. In addition, it is described that a total number of reaction vessels is 221, and 112 reaction vessels is moved in one analysis cycle.

PRIOR ART LITERATURE

Patent Literature

PTL 1: JP-A-5-164763
PTL 2: JP-A-10-62429

SUMMARY OF INVENTION

Technical Problem

However, in the configuration of the automatic analysis device described in Patent Literature 1, the number of reaction detection tubes moved in one analysis cycle is $M<N/2$, that is, less than half. In general, since the reaction detection tubes are spaced apart from each other at equal intervals in the rotary table, a moving distance of the rotary table in one analysis cycle is also less than ½ rotation, which is advantageous for improving the processing capacity.

Therefore, this method is used for a large automatic analysis device with a processing capacity of 1000 test/h or more per unit time. However, in this method, since the moving distance of the rotary table in one analysis cycle is less than ½ rotation, the absorbance measurement of the reaction liquid, which is the mixture of the specimen and the reagent in the light detector, can be performed only approximately every two analysis cycles at most. Assuming that this method is applied to a small automatic analysis device with a processing capacity of 400 test/h per unit time, 400 specimens being measured per hour means that one cycle takes 9 seconds. Assuming that the time from the addition of the specimen and the reagent to a certain reaction detection tube to obtaining the measurement result is 10 minutes, since the movement of the rotary table in one analysis cycle is less than ½ rotation, a measurement number of reaction measurement between the specimen and the reagent in the light detector in 10 minutes is extremely reduced to less than 33 times, and there is a possibility that necessary reaction process data cannot be obtained if the movement of the rotary table per analysis cycle is less than ½ rotation.

In the configuration of the automatic analysis device described in Patent Literature 2, a reagent pipette and a stirring mechanism can be combined, but since the rotary table moves by an amount equivalent to 112 reaction vessels in one analysis cycle with respect to 221 reaction vessels, the rotary table stops at a position moved by 1 rotation+an amount equivalent to 3 reaction vessels after two analysis cycles. In this way, a reaction vessel is shifted by three reaction vessels in one rotation, and therefore, the cleaning positions of the reaction vessels also appear to be dispersed in the rotary table and not adjacent to the reaction vessels whose reaction liquid is measured and can be cleaned. Therefore, in order to perform a series of cleaning operations by the cleaning mechanism, it is necessary to occupy a large area on the rotary table as a cleaning area, which may impair the design freedom of the automatic analysis device.

Therefore, the invention provides the automatic analysis device with which sufficient reaction process data can be acquired irrespective of the scale of the device, and with which freedom of the device configuration can be ensured.

Solution to Problem

In order to solve the above problems, an automatic analysis device according to the invention includes: a reaction disk which accommodates a plurality of reaction vessels capable of accommodating a dispensed specimen and reagent such that the reaction vessels are spaced apart from each other at predetermined intervals circumferentially; a specimen dispensing mechanism which dispenses a predetermined amount of the specimen into the reaction vessel; a reagent dispensing mechanism which dispenses a predetermined amount of the reagent into the reaction vessel; a measuring unit which measures a reaction liquid during a reaction process and/or after reaction of a mixture of the specimen and the reagent in the reaction vessel; a cleaning mechanism which cleans the reaction vessel after measurement; and a controller which controls drive of the reaction disk such that in one cycle the reaction vessels move by an amount A in a circumferential direction in such a way that N and A are mutually prime, B and C are mutually prime, and a relationship $A \times B = N \times C \pm 1$ holds, where N is a total number of reaction vessels accommodated in the reaction disk, the reaction disk moves through C (where C>1) rotations+an amount equivalent to one reaction vessel after B (where B>2) cycles, and the number of reaction vessels moved in one cycle is A (where N>A>N/B+1).

Advantageous Effect

According to the invention, it is possible to provide an automatic analysis device with which sufficient reaction process data can be acquired irrespective of the scale of the device, and with which freedom of the device configuration can be ensured.

Problems, configurations, and effects other than those described above will be apparent from the description of the embodiments below.

BRIEF DESCRIPTION OF DRAWINGS

FIG. 1 is an overall schematic configuration diagram of an automatic analysis device according to one embodiment of the invention.

FIG. 2 is a diagram illustrating the arrangement of a plurality of reaction vessels accommodated in a reaction disk which constitutes the automatic analysis device of a first embodiment according to the embodiment of the invention.

FIG. 3 is a functional block diagram of a controller which constitutes the automatic analysis device of the first embodiment.

FIG. 4 is a diagram illustrating an analysis process in the automatic analysis device of the first embodiment.

FIG. 5 is a functional block diagram of a controller which constitutes an automatic analysis device of a second embodiment according to another embodiment of the invention.

FIG. 6 is a diagram illustrating the arrangement of a plurality of reaction vessels accommodated in a reaction disk which constitutes the automatic analysis device of the second embodiment.

FIG. 7 is a diagram illustrating the arrangement of the plurality of reaction vessels accommodated in the reaction disk which constitutes automatic analysis device of the second embodiment.

FIG. 8 is a functional block diagram of a controller which constitutes an automatic analysis device according to a third embodiment according to another embodiment of the invention.

FIG. 9 is a diagram illustrating the arrangement of a plurality of reaction vessels accommodated in a reaction disk which constitutes the automatic analysis device of the third embodiment.

FIG. 10 is a diagram illustrating the arrangement of the plurality of reaction vessels accommodated in the reaction disk which constitutes the automatic analysis device of the third embodiment.

FIG. 11 is a diagram illustrating the arrangement of the plurality of reaction vessels accommodated in the reaction disk which constitutes the automatic analysis device of third embodiment.

DESCRIPTION OF EMBODIMENTS

In the description, the term "specimen" includes both blood or urine of hospitalized patients or outpatients, and a biological specimen such as blood or urine of a subject in a medical checkup.

FIG. 1 is an overall schematic configuration diagram of an automatic analysis device according to one embodiment of the invention. As shown in FIG. 1, an automatic analysis device 100 is mainly configured by: a rack 16 in which a plurality of specimen vessels 15 for accommodating specimens are mounted; a specimen transport mechanism 17 which transports the rack 16 to a desired position; a reaction disk 1 which accommodates a plurality of reaction vessels 2 spaced apart from each other at predetermined intervals along a circumferential direction (circumferentially); a reagent disk 9 which accommodates a plurality of reagent bottles 10 accommodating various reagents along a circumferential direction (circumferentially); a specimen dispensing mechanism 11 which dispenses a predetermined amount of specimen in the specimen vessel 15 into the reaction vessel 2; a reagent dispensing mechanism 7 which dispenses a predetermined amount of reagent in the reagent bottle 10 into the reaction vessel 2; a stirring mechanism 5 which stirs and mixes the dispensed specimen and reagent in the reaction vessel 2; a measuring unit 4 which measures a reaction process of a mixture of the specimen and the reagent in the reaction vessel 2 and a reaction liquid after reaction; a cleaning mechanism 3 which cleans the reaction vessel 2 after measurement; and a controller 21 which controls these operations.

In addition, the reagent dispensing mechanism 7 disposed between the reaction disk 1 and the reagent disk 9 includes a reagent nozzle 7a, and a reagent pump 18a is connected to the reagent nozzle 7a. Here, a syringe pump, for example, is used as the reagent pump 18a. The specimen dispensing mechanism 11 disposed between the reaction disk 1 and the specimen transport mechanism 17 and capable of rotating in a circular arc shape and moving vertically includes a specimen dispensing nozzle 11a. A specimen pump 18c is connected to the specimen nozzle 11a. The specimen nozzle 11a moves while drawing a circular arc around a rotation axis of the specimen dispensing mechanism 11, and sucks a specimen from the specimen vessel 15 or the reaction vessel 2, and discharges the specimen to another reaction vessel 2 on the reaction disk 1 so as to dispense the specimen. Here, a syringe pump, for example, is used as the specimen pump 18c.

The measuring unit 4 includes a light source (not shown) disposed inside the reaction disk 1, and a spectrophotometer disposed opposite to the light source so as to sandwich the reaction vessel 2, detects transmitted light obtained by irradiation light emitted from the light source (not shown) transmitting through the reaction liquid which is the mixture of the specimen and the reagent in the reaction vessel 2, and measures an absorbance. In the measuring unit 4, the absorbance is not limited to be measured by the spectrophotometer, and, for example, a detector which detects transmitted light and scattered light may be used instead of the spectrophotometer.

The stirring mechanism 5 includes, for example, a stirring blade or a spatula rod (not shown) provided at a tip end, and infiltrates the stirring blade or the spatula rod (not shown) into the reaction liquid which is the mixture of the specimen and the reagent in the reaction vessel 2 and rotates the stirring blade or the spatula rod to stir.

A cleaning pump 20 and a vacuum pump 22 are connected to the cleaning mechanism 3. A cleaning tank 13 for cleaning the reagent nozzle 7a of the reagent dispensing mechanism 7 is disposed between the reaction disk 1 and the reagent disk 9. A cleaning tank 30 for cleaning the specimen nozzle 11a of the specimen dispensing mechanism 11 is disposed between the reaction disk 1 and the specimen transport mechanism 17, and a cleaning tank 32 for cleaning the stirring blade or the spatula rod (not shown) of the stirring mechanism 5 is disposed between the reaction disk 1 and the stirring mechanism 5 to prevent contamination.

The reaction disk 1 is rotationally driven by, for example, a stepping motor or a pulse motor (not shown). The controller 21 described below outputs a control signal (control command) to the stepping motor or the pulse motor (not shown) to rotationally drive the reaction disk 1 such that the reaction vessels 2 move by an amount A in one cycle, in other words, a pitch number of every cycle is A, in such a way that the relationship A×B=N×C±1 holds, where N is a total number of reaction vessels 2 accommodated in the reaction disk 1, the reaction disk 1 moves through C (where C>1) rotations±an amount equivalent to one reaction vessel after B (where B>2) cycles, and the number of reaction vessels 2 moved in one cycle is A (where N>A>N/B+1). The total number N of the reaction vessels 2 and the number A of reaction vessels 2 moved in one cycle are mutually prime, and B and C are mutually prime.

Hereinafter, as shown in FIG. 1, the case where the automatic analysis device includes the rack 16 in which a plurality of the specimen vessels 15 for accommodating the specimens are mounted and the specimen transport mechanism 17 which transports the rack 16 to the desired position is described as an example, but the invention is not limited thereto. For example, the plurality of the specimen vessels 15 may be accommodated along the circumferential direction (circumferentially) on the specimen disk, or a specimen disk which accommodates the plurality of the specimen vessels 15 along the circumferential direction of an inner circumferential side and an outer circumferential side in a concentric circular shape may be used.

Hereinafter, embodiments of the invention will be described with reference to the drawings.

First Embodiment

FIG. 2 is a diagram illustrating the arrangement of a plurality of reaction vessels accommodated in a reaction disk which constitutes the automatic analysis device of a first embodiment according to the embodiment of the invention. In FIG. 2, the indication of the controller 21 shown in FIG. 1 is omitted. As shown in the upper drawing of FIG. 2, in an automatic analysis device 100 of the present embodiment, 28 reaction vessels 2-1 to 2-28 are accommodated in the reaction disk 1 while being spaced apart from each other at predetermined intervals along a circumferential direction (circumferentially). As shown by an arrow, the reaction disk 1 is repeatedly rotated and stopped by 17 reaction vessels 2 clockwise in one cycle, 17×5=85 for the reaction vessels 2 in five cycles, that is, the total number of reaction vessels 2 which is 28×3 circles+an amount equivalent to one reaction vessel 2=85, and the reaction disk 1 is stopped at a position moving through 3 rotations+an amount equivalent to one reaction vessel 2 after five cycles. In the description, when referring to a specific reaction vessel accommodated in the reaction disk 1, any one of the reaction vessels 2-1 to 2-28 is used, and when referring to any reaction vessel or the reaction vessel generically, the reaction vessel 2 is used. One cycle is defined as the time from the specimen dispensing mechanism 11 dispensing a specimen for measurement from the specimen vessel 15 into one reaction vessel 2, the reaction disk 1 being rotated and stopped, to the time the specimen being dispensed into the next reaction vessel 2. Therefore, in the example shown in the upper drawing of FIG. 2, since the position at which the specimen is dispensed from the specimen vessel 15 into the reaction vessel 2 by the specimen dispensing mechanism 11 is a specimen discharge position 41, at the time point after 5 cycles, the specimen for measurement from the specimen vessel 15 is dispensed by the specimen dispensing mechanism 11 into the reaction vessel 2-1, the reaction vessel 2-12, the reaction vessel 2-23, the reaction vessel 2-6, and the reaction vessel 2-17. By repeating the above operation, the reaction vessel returns to the same position after 28 cycles. The total number 28 of reaction vessels 2 and the number 17 of reaction vessels 2 moved in one cycle are mutually prime, and a number of cycles 5 after which the reaction vessel 2 is shifted by an amount of ±1 from an original position and the number of revolutions (number of rotations) 3 the reaction disk 1 rotates during this time are also mutually prime. That is, N and A are mutually prime, B and C are mutually prime, and the above relationship A×B=N×C±1 holds, where the total number N of the reaction vessels 2 accommodated in the reaction disk 1 is 28, the number A (where N>A>N/B+1) of reaction vessels 2 moved in one cycle is 17, and the reaction disk 1 moves through C (where C>1) rotations (3 rotations) ±an amount equivalent to one reaction vessel after B (where B>2) cycles (5 cycles).

In the upper drawing of FIG. 2, the numbers shown in parentheses in an outer peripheral side of the reaction disk 1, that is, [1] to [28] are numbers indicating at which position the reaction vessel 2-1 stops in cycles [1] to [28] when the reaction vessel 2-1 into which the specimen is dispensed at the specimen discharge position 41 by the specimen dispensing mechanism 11 is used as the reaction vessel of cycle [1]. A specimen suction position 42 is a position where a pretreated specimen is sucked from the reaction vessel 2 by the specimen dispensing mechanism 11; a first reagent discharge position 43 by the reagent dispensing mechanism 7; a second reagent discharge position 44 by the reagent dispensing mechanism 7; a first stirring position 45 is a position where the reaction liquid, which is a mixture of the specimen and the first reagent in the reaction vessel 2 after the first reagent is discharged, is stirred by the stirring mechanism 5; a second stirring position 46 is a position where the reaction liquid, which is a mixture of the specimen and the first reagent and a second reagent in the reaction vessel 2 after the second reagent is discharged, is stirred by the stirring mechanism 5; and an absorbance measurement position 47 is a position where absorbance of the reaction liquid is measured by the spectrophotometer as the measuring unit 4. In addition, the lower drawing of FIG. 2 schematically shows the reaction disk 1 in the upper drawing of FIG. 2, assuming that a position number of reaction vessel is 1 when a specimen dispensing (discharge) position is 1, [1] shows a reaction progress cycle when the specimen dispensing (discharge) position is 1, and represents that it is a 1st cycle.

As shown in the upper drawing and the lower drawing of FIG. 2, when focusing on the reaction vessel 2-1, a predetermined amount of specimen is dispensed from the specimen vessel 15 into the reaction vessel 2-1 by the specimen dispensing mechanism 11 in the 1st cycle (cycle [1]). Next, in a 2nd cycle (cycle [2]), a predetermined amount of the first reagent is dispensed into the reaction vessel 2-1, to which the predetermined amount of specimen is already dispensed, by the reagent dispensing mechanism 7. In a 3rd cycle (cycle [3]), the reaction vessel 2-1 passes through the absorbance measurement position 47 during the reaction vessel 2-1 accommodating the reaction liquid which is a mixture of the specimen and the first reagent moves to the first stirring position 45. At this time, the absorbance at the absorbance measurement position 47 is measured by the spectrophotometer as the measuring unit 4. At the first stirring position 45, the reaction liquid which is mixture of the specimen and the first reagent in the reaction vessel 2-1 is stirred and mixed by the stirring mechanism 5, and the reaction vessel 2-1 moves to a 4th cycle (cycle [4]). At this time, when the reaction vessel 2-1 passes through the absorbance measurement position 47, the absorbance at the absorbance measurement position 47 is measured by the spectrophotometer as the measuring unit 4. In a 6th cycle (cycle [6]), the reaction vessel 2-1 moves to the specimen suction position 42 and stops. Also during this time, the absorbance at the absorbance measurement position 47 is measured by the spectrophotometer as the measuring unit 4. Thereafter, the reaction vessel 2-1 sequentially moves until a 28th cycle (cycle [28]), and in the 28th cycle, the reaction vessel 2-1 is cleaned by the cleaning mechanism 3, and after that, the reaction vessel 2-1 moves to the 1st cycle (cycle [1]) again which is the specimen discharge position 41.

FIG. 3 is a functional block diagram of the controller 21 which constitutes the automatic analysis device 100. FIG. 4 is a diagram illustrating an analysis process in the automatic analysis device 100. In FIG. 4, a horizontal axis represents cycles [1] to [28], and the analysis process performed in each cycle is illustrated.

First, as shown in FIG. 3, the controller 21 includes an input unit 211, an input I/F 212, a measured value acquisition unit 213, a specimen dispensing mechanism control unit 214, a reagent dispensing mechanism control unit 215, a storage unit 216, a specimen transport mechanism control unit 217, a reaction disk rotation control unit 218, a stirring mechanism control unit 219, a cleaning mechanism control unit 220, an analysis item concentration calculation unit 221, an output unit 222, and an output I/F 223. These units are connected to one another via an internal bus 224. The measured value acquisition unit 213, the specimen dispensing mechanism control unit 214, the reagent dispensing mechanism control unit 215, the specimen transport mechanism control unit 217, the reaction disk rotation control unit 218, the stirring mechanism control unit 219, the cleaning mechanism control unit 220, and the analysis item concentration calculation unit 221 are realized by, for example, a processor such as a central processing unit (CPU) (not shown), a ROM storing various programs, a RAM temporarily storing data of calculation process, and a storage device such as an external storage device; the processor such as the CPU reads and executes various programs stored in the ROM, and stores the calculation result, which is the execution result, in the RAM or the external storage device. In the present embodiment, for convenience of description, the measured value acquisition unit 213, the specimen dispensing mechanism control unit 214, the reagent dispensing mechanism control unit 215, the specimen transport mechanism control unit 217, the reaction disk rotation control unit 218, the stirring mechanism control unit 219, the cleaning mechanism control unit 220, and the analysis item concentration calculation unit 221 are shown indifferent functional books, but a functional block as a control unit of any desired combination of these units may be configured to execute a plurality of programs for realizing each function of the control unit.

The input unit 211 is configured by, for example, a pointing device, a keyboard, or a tablet. Parameters such as the type of the specimen, an analysis item, a dispensing amount (liquid amount) of the specimen and a reagent according to the analysis item, and the number A (where $N>A>N/B+1$) of the reaction vessels 2 moved in one cycle or the number of cycles B (where $B>2$) described above are set in advance by an upper controller (not shown), and are stored in a predetermined storage area of the storage unit 216. The parameters stored in the storage unit 216 may be changed by a user (examination engineer) via the input unit 211. In this case, when the input unit 211 receives a change in the parameter described above, the changed parameter is stored in a predetermined storage area of the storage unit 216 via the input I/F 212 and the internal bus 224. In addition, the number A (where $N>A>N/B+1$) of the reaction vessels 2 moved in one cycle or the number of cycles B (where $B>2$) is transferred to the reaction disk rotation control unit 218 via the internal bus 224.

Based on the number A (where $N>A>N/B+1$) of the reaction vessels 2 moved in one cycle or the number of cycles B (where $B>2$) transferred via the internal bus 224 and the total number N of the reaction vessels 2 accommodated in the reaction disk 1 which is already known, where the relationship $A \times B = N \times C \pm 1$ is satisfied, N and A are mutually prime, and B and C are mutually prime, the reaction disk rotation control unit 218 obtains C and A or B. Here, as shown in FIG. 2, the total number N of the reaction vessels 2 accommodated in the reaction disk 1 is 28, and it is obtained that the number A (where $N>A>N/B+1$) of reaction vessels 2 moved in one cycle is 17, the number of cycles B (where B>2) is 5, and the number of rotations C (where C>1) is 3. The reaction disk rotation control unit 218 stores the number A of the reaction vessel 2 moved in one cycle, the number of cycles B, and the number of rotations C obtained above in the storage unit 216. In addition, the reaction disk rotation control unit 218 outputs a control signal (control command) corresponding to 17 which is the obtained number A (where N>A>N/B+1) of the reaction vessels 2 moved in one cycle, that is, a pitch number 17, to a stepping motor or a pulse motor which rotationally drives the reaction disk 1 via the output I/F 223 every cycle.

The measured value acquisition unit 213 acquires the measured value of the absorbance measured by the spectrophotometer as the measuring unit 4, performs processing such as AD conversion and/or smoothing (noise removal), and stores the measured value in a predetermined storage area of the storage unit 216 via the internal bus 224.

In addition to the type of the specimen, the analysis item, the dispensing amount (liquid amount) of the specimen and the reagent according to the analysis item, the number A of the reaction vessels 2 moved in one cycle, the number of cycles B and the number of rotations C obtained by reaction disk rotation control unit 218, and the measured value of absorbance after processing such as the AD conversion and/or the smoothing (noise removal) by the measured value acquisition unit 213 described above, the storage unit 216 stores a calibration curve showing the relationship between the absorbance set in advance and a concentration value of the analysis item.

The specimen transport mechanism control unit 217 outputs a control signal (control command) to the specimen transport mechanism 17 via the output I/F 223, so that the rack 16, on which a plurality of the specimen vessels 15 accommodating the specimen is mounted, is transported to a position (desired position) where the suction by the specimen dispensing mechanism 11 can be performed.

The specimen dispensing mechanism control unit 214 accesses the storage unit 216, reads the type of the specimen, the analysis item, the dispensing amount (liquid amount) of the specimen according to the analysis item, and outputs a stroke amount of a syringe pump corresponding to the dispensing amount (liquid amount) of the specimen to the specimen pump 18c connected to the specimen dispensing mechanism 11 via the output I/F 223 as the control signal (control command). In addition, the specimen dispensing mechanism control unit 214 performs control so that the specimen nozzle 11a which constitutes the specimen dispensing mechanism 11 is operated to draw a circular arc toward the specimen vessel 15 to suck a predetermined amount of specimen, and then to draw a circular arc toward the reaction vessel 2 to discharge the specimens.

The reagent dispensing mechanism control unit 215 accesses the storage unit 216, reads a dispensing amount (liquid amount) of the first reagent and the second reagent according to the analysis item, and outputs a stroke amount of the syringe pump corresponding to the dispensing amount (liquid amount) of the first reagent and the second reagent to the specimen pump 18a connected to the reagent dispensing mechanism 7 via the output I/F 223 as the control signal (control command). In addition, the reagent dispensing mechanism control unit 215 performs control so that the reagent nozzle 7a which constitutes the reagent dispensing mechanism 7 is operated to draw an circular arc toward the reagent bottle 10 to suck a predetermined amount of the first reagent or the second reagent, and then to draw a circular arc toward a reaction vessel 2 positioned at the first reagent discharge position 43 to discharge the first reagent, and toward a reaction vessel 2 positioned at the second reagent discharge position 44 to discharge the second reagent.

The stirring mechanism control unit 219 outputs a control signal (control command) to the stirring mechanism 5 via the output I/F 223 so as to stir, with a predetermined stirring intensity, the reaction liquid which is the mixture of the specimen and the first reagent, or the reaction liquid which is a mixture of the specimen, the first reagent and the second reagent in the reaction vessel 2 positioned at the first stirring position 45 or the second stirring position 46.

The analysis item concentration calculation unit 221 accesses the storage unit 216 to obtain the concentration value of the analysis item of the specimen based on the measured value of absorbance and the calibration curve, and outputs the obtained concentration value of the analysis item of the specimen to the output unit 222 configured by a display device or a printer.

The cleaning mechanism control unit 220 outputs a drive command to the cleaning pump 20 and the vacuum pump 22 connected to the cleaning mechanism 3 via the output I/F 223 as the control signal, so that the reaction liquid in the reaction vessel 2 accommodating the reaction liquid that has been measured is sucked by the vacuum pump 22, and the reaction vessel 2 is cleaned by the cleaning pump 20.

Next, the analysis process performed in each cycle will be described. As shown in FIG. 4, in the 1st cycle (cycle [1]), dispensing is performed by the specimen dispensing mechanism 11 on a reaction vessel 2 stopped at the specimen discharge position 41, for example, the reaction vessel 2-1 in FIG. 2, based on a type of the specimen, an analysis item, and a dispensing amount (liquid amount) of the specimen according to the analysis item from the specimen dispensing mechanism control unit 214 (FIG. 3) which constitutes the controller 21. After the specimen dispensing is finished, the reaction disk 1 moves by an amount equivalent to 17 reaction vessels 2 clockwise based on the control signal (control command) from the reaction disk rotation control unit 218 (FIG. 3) which constitutes the controller 21, and stops at the first reagent discharge position 43. In cycle [2] (2nd cycle), the reagent dispensing mechanism 7 sucks a dispensing amount (liquid amount) of the first reagent according to the analysis item from the reagent dispensing mechanism control unit 215 (FIG. 3) which constitutes the controller 21 from the reagent bottle 10 accommodated in the reagent disk 9. Then, the reagent dispensing mechanism 7 discharges the first reagent to the reaction vessel 2-1 positioned at the first reagent discharge position 43. After the reagent is discharged, the reaction disk 1 moves by the amount equivalent to 17 reaction vessels 2 clockwise based on the control signal (control command) from the reaction disk rotation control unit 218 (FIG. 3), and stops at the first reagent stirring position 45. At this time, the reaction vessel 2-1 passes through the absorbance measurement position 47 where the spectrophotometer is disposed as the measuring unit 4, and the absorbance of the reaction liquid, which is the mixture of the specimen and the first reagent, is measured, and the measured value of the absorbance is stored in a predetermined storage area of the storage unit 216 which constitutes the controller 21. In the subsequent cycles, each time the reaction vessel 2-1 passes through the absorbance measurement position 47, a measured value of the absorbance of the reaction liquid, which is the mixture of the specimen and the first reagent, is stored in the storage unit 216 of the controller 21.

In cycle [3] (3rd cycle), the specimen and the first reagent accommodated in the reaction vessel 2-1 stopped at the first stirring position 45 are stirred based on the predetermined stirring intensity from the stirring mechanism control unit 219 which constitutes the controller 21, and after the stirring, the reaction disk 1 moves by the amount equivalent to 17 reaction vessels 2 clockwise based on the control signal (control command) from the reaction disk rotation control unit 218 (FIG. 3). The reaction disk 1 is repeatedly rotated and stopped, and the reaction vessel 2-1 is stopped at the specimen suction position 42 adjacent to the specimen discharge position 41 in cycle [6] (6th cycle). When the analysis item is an analysis item in which pretreatment of blood cells is necessary before measurement, for example, as in hemoglobin A1c measurement, the specimen dispensing mechanism 11 can suck the pretreated specimen from the specimen suction position 42 and discharge the pretreated specimen to the reaction vessel 2-28 stopped at the specimen discharge position 41 adjacently, so as to analyze this pretreated specimen. For an analysis item in which the pretreatment is not necessary and the second reagent needs to be added in the specimen, the reaction vessel 2-1 stops at the second reagent discharge position 44 in cycle [12] (12th cycle). The reagent dispensing mechanism 7 sucks the dispensing amount (liquid amount) of the second reagent from the reagent dispensing mechanism control unit 215 from the reagent bottle 10 accommodated in the reagent disk 9, and discharges the second reagent to the reaction vessel 2-1 positioned at the second reagent dispensing position 44. After the second reagent is discharge, in cycle [13] (13th cycle), the reaction disk 1 moves by the amount equivalent to 17 reaction vessels 2 clockwise based on the control signal (control command) from the reaction disk rotation control unit 218 (FIG. 3), and stops at the second stirring position 46. The specimen, the first reagent and the second reagent accommodated in the reaction vessel 2-1 positioned at the second stirring position 46 are stirred by the stirring mechanism 5 based on the predetermined stirring intensity from the stirring mechanism control unit 219, and after the stirring, the reaction disk 1 moves by an amount equivalent to 17 reaction vessels 2 clockwise based on the control signal (control command) from the reaction disk rotation control unit 218 (FIG. 3). The analysis is completed at cycle [18] (18th cycle), and from cycle [19] (19th cycle), measurement by the spectrophotometer as the measuring unit 4 is not performed, and the automatic analysis device 100 can clean the reaction vessel 2-1.

As shown in the upper drawing of FIG. 2, from the distribution of, for example, the reaction vessel 2-1, it can be seen that the reaction disk 1 is divided into B, and in the present embodiment, divided into 5 since the number of cycles B is 5, based on stop positions of the reaction vessel 2-1 in cycle [1] to cycle [5] (1st to 5th cycles), and the reaction vessel 2-1 in cycle [1] to cycle [5] (1st to 5th cycles) moves to the adjacent position in a clockwise direction after every B cycles (five cycles in the present embodiment). For example, as shown in the upper drawing of FIG. 2, in a rotational direction of the reaction disk 1 (clockwise direction), the reaction vessel 2-1 in cycle [6] after five cycles is positioned adjacently to the position of the reaction vessel 2-1 in cycle [1] (1st cycle) by one position advanced, and further, the reaction vessel 2-1 in cycle [11] after five more cycles is arranged adjacently to the position of the reaction vessel 2-1 in cycle [6] by one position advanced. Similarly, in a rotational direction of the reaction disk 1 (clockwise direction), the reaction vessel 2-1 in cycle [8] after five cycles is positioned adjacently to the position of the reaction vessel 2-1 in cycle [3] (3rd cycle) by one position advanced, and further, the reaction vessel 2-1 in cycle [13] after five more cycles is adjacently arranged to the position of the reaction vessel 2-1 in cycle [8] by one position advanced. This applies not only to the reaction vessel 2-1 but also to the reaction vessels 2-2 to 2-28.

As shown in the lower drawing of FIG. 2, it can be seen that reaction vessels (shown by a black circle in the drawing) that can be cleaned from cycle [19] (19th cycle) are also arranged in five divided blocks. Specifically, assuming that two cycles are needed to clean the reaction vessel 2 by the cleaning mechanism 3, as shown in the lower drawing of FIG. 2, it is possible to arrange the cleaning mechanism 3 at a position where it is easy to lay out from among the adjacent cycle [21] and cycle [26] in a first block, the adjacent cycle [23] and cycle [28] in a third block, the cycle [20] and cycle [25] in a fifth block, the adjacent cycle [22] and cycle [27] in a second block, and the adjacent cycle [19] and cycle [24] in a fourth block. That is, the adjacent positions where the reaction vessel can be cleaned by the cleaning mechanism 3 in two cycles apart by five cycles are substantially uniformly dispersed at B places (five places), so that an installation position of the cleaning mechanism 3 can be selected from the B places (five places), and therefore, it is very advantageous in considering the optimum layout.

In the present embodiment, as shown in the upper diagram of FIG. 2 and FIG. 4, the cleaning mechanism 3 is disposed at the position of cycle [23] at which the reaction vessel 2-1 is positioned at a 23rd cycle and the position of cycle [28] at which the reaction vessel 2-1 is positioned at a 28th cycle, so as to clean the reaction vessel 2-1.

As described above, when the automatic analysis device 100 of the present embodiment is used, the relationship $A \times B = N \times C \pm 1$ is satisfied, where a rotation angle of the reaction disk 1 in one analysis cycle (one cycle), that is, the number of the reaction vessels 2 moved in one cycle is A (where $N>A>N/B+1$), N is a total number of reaction vessels 2 accommodated in the reaction disk 1, and the reaction disk 1 moves through C (where $C>1$) rotations+an amount equivalent to one reaction vessel after B (where $B>2$) cycles, and the total number N of reaction vessels 2 and the number A of reaction vessels 2 moved in one cycle are mutually prime, and B and C are mutually prime; and the number A of reaction vessels 2 moved in one cycle can be freely set according to the scale of the automatic analysis device. In this embodiment, one set of N=28, A=17, B=5, and C=3 is shown as a combination in which the relationship $A \times B = N \times C \pm 1$ is satisfied, N and A are mutually prime, and B and C are mutually prime, but the invention is not limited thereto. For example, when N=128, A=77, B=5, and C=3, $A \times B = 385$, $N \times C + 1 = 385$, and the relationship $A \times B = N \times C \pm 1$ is satisfied. When N=128, A=51, B=5, and C=2, $A \times B = 255$, $N \times C - 1 = 255$, and the relationship $A \times B = N \times C \pm 1$ is satisfied. Further, when N=28, A=11, B=5, and C=2, $A \times B = 55$, $N \times C - 1 = 55$, and the relationship $A \times B = N \times C \pm 1$ is satisfied. When N=55, A=41, B=4, and C=3, $A \times B = 164$, $N \times C - 1 = 164$, and the relationship $A \times B = N \times C \pm 1$ is satisfied. In this way, there are innumerable combinations satisfy the relationship $A \times B = N \times C \pm 1$, where the number of reaction vessels 2 moved in one cycle is A (where $N>A>N/B+1$), the total number of reaction vessels 2 accommodated in the reaction disk 1 is N, the reaction disk 1 moves through C (where $C>1$) rotations+an amount equivalent to one reaction vessel after B (where $B>2$) cycles, and the total number N of reaction vessels 2 and the number A of reaction vessels 2 moved in one cycle are mutually prime, and B and C are mutually prime. In addition, as described above, a reaction vessel is always adjacent to the reaction vessel after ±B cycles. Accordingly, a reaction vessel after the analysis is also positioned adjacently to the reaction vessel after every B cycles, and the series of cleanable continuous reaction vessels are substantially uniformly dispersed at B places on the reaction disk, so that the B places can be selected as the installation position of the cleaning mechanism, and therefore, it is very advantageous in considering the optimum layout.

In the examples shown in FIGS. 2 and 4, one reagent dispensing mechanism 7 and one stirring mechanism 5 are disposed from the viewpoint of using a unit for a small automatic analysis device, and in this case, during the stop of the reaction disk 1, the reagent dispensing mechanism 7 must discharge the first reagent and the second reagent to the respective reaction vessels 2 stopped at the first reagent discharge position 43 and the second reagent discharge position 44. Similarly, during the stop of the reaction disk 1, the stirring mechanism 5 must stir the reaction liquid accommodated in the respective reaction vessels 2 stopped at the first stirring position 45 and the second stirring position 46. Therefore, in order to improve the processing capacity, it is effective to use a plurality of reagent dispensing mechanisms and stirring mechanisms to shorten the time when the reaction disk 1 is stopped. As for the specimen dispensing mechanism 11, for example, it is also possible to divide the specimen dispensing mechanism by the difference between the specimen such as whole blood, which has a relatively high viscosity and requires time for specimen suction, and the specimen such as ordinary serum, to cope with high processing capacity.

Also, for a specimen that needs to be pretreated and re-dispensed to another reaction vessel, in a related method in which the reaction disk 1 moves through one rotation+an amount equivalent to one reaction vessel in one cycle, for example, since the specimen subjected to the pretreatment moves away from the specimen discharge position 41 by one reaction vessel every one cycle, it becomes difficult to access the specimen discharge position 41 and the specimen suction position 42 by one specimen dispensing mechanism 11 in order to ensure the time until the reagent and the specimen are mixed and the pretreatment becomes stable.

In contrast, according to the automatic analysis device 100 of the present embodiment, since other reaction vessels are continuously arranged from the specimen discharge position 41 every B cycles, it is suitable to suck the pretreated specimen from the reaction vessel 2 near the specimen discharge position 41 at an appropriate timing. The process can also be realized in a method disclosed in the related Patent Literature 1, in which $N\pm1=A\times M$ (A is an integer of 2 or more) is satisfied where the number of reaction detection tubes is N, the number of reaction detection tubes moved in one analysis cycle is M, there is no common factor other than 1 between N and M and $M<N/2$; and the reaction detection tubes are repeatedly moved, but the rotation of the reaction disk per analysis cycle is less than ½, and the time interval for the spectrophotometer as the measuring unit 4 to measure the reaction liquid in the reaction vessel becomes long, and the analytical performance is impaired. In contrast, according to the automatic analysis device 100 of the present embodiment, the rotation angle of the reaction disk 1 per cycle can be freely set, so that it is possible to set the rotation angle of the reaction disk 1 for one rotation and one cycle, that is, the time interval for the spectrophotometer as the measuring unit 4 to measure is not increased, and the specimen suction position 42 where the pretreated specimen is collected can be arranged in the vicinity of the specimen discharge position 41.

As described above, according to the present embodiment, it is possible to provide an automatic analysis device with which sufficient reaction process data can be acquired irrespective of the scale of the device, and with which freedom of the device configuration can be ensured.

According to the present embodiment, a reaction vessel after the analysis is also positioned adjacently to the reaction vessel after every B cycles, and the series of cleanable continuous reaction vessels are substantially uniformly dispersed at B places on the reaction disk, so that the B places can be selected as the installation position of the cleaning mechanism, and therefore, it is very advantageous in considering the optimum layout.

Further, according to the present embodiment, the rotation angle of the reaction disk 1 per cycle can be freely set, so that it is possible to set the rotation angle of the reaction disk 1 for one rotation and one cycle, that is, the time interval for the spectrophotometer as the measuring unit 4 to measure is not increased, and the specimen suction position 42 where the pretreated specimen is collected can be arranged in the vicinity of the specimen discharge position 41.

Second Embodiment

FIG. 5 is a functional block diagram of a controller which constitutes an automatic analysis device of a second embodiment according to another embodiment of the invention. FIGS. 6 and 7 are diagrams illustrating arrangements of a plurality of reaction vessels accommodated in a reaction disk which constitutes the automatic analysis device of the second embodiment. The present embodiment is different from the first embodiment in that a reaction disk rotation control unit 218a of a control roller 21a which constitutes an automatic analysis device 100a controls the reaction disk 1 such that the reaction disk 1 stops once when the reaction disk 1 moves by the number A of the reaction vessels 2 in one cycle. Other configurations are the same as those of the first embodiment, and the same components as those in the first embodiment are denoted by the same reference numerals.

As shown in FIG. 5, the controller 21a includes the input unit 211, the input I/F 212, the measured value acquisition unit 213, the specimen dispensing mechanism control unit 214, the reagent dispensing mechanism control unit 215, the storage unit 216, the specimen transport mechanism control unit 217, the reaction disk rotation control unit 218a, the stirring mechanism control unit 219, the cleaning mechanism control unit 220, the analysis item concentration calculation unit 221, the output unit 222, and the output I/F 223. These units are connected to one another via the internal bus 224. The measured value acquisition unit 213, the specimen dispensing mechanism control unit 214, the reagent dispensing mechanism control unit 215, the specimen transport mechanism control unit 217, the reaction disk rotation control unit 218a, the stirring mechanism control unit 219, the cleaning mechanism control unit 220, and the analysis item concentration calculation unit 221 are realized by, for example, a processor such as a central processing unit (CPU) (not shown), a ROM storing various programs, a RAM temporarily storing data of calculation process, and a storage device such as an external storage device; and the processor such as the CPU reads and executes various programs stored in the ROM, and stores the calculation result, which is the execution result, in the RAM or the external storage device. In the present embodiment, for convenience of description, the measured value acquisition unit 213, the specimen dispensing mechanism control unit 214, the reagent dispensing mechanism control unit 215, the specimen transport mechanism control unit 217, the reaction disk rotation control unit 218, the stirring mechanism control unit 219, the cleaning mechanism control unit 220, and the analysis item concentration calculation unit 221 are shown in different functional books, but a functional block as a control unit of any desired combination of these units may be configured to execute a plurality of programs for realizing each function of the control unit.

The input unit 211 is configured by, for example, a pointing device, a keyboard, or a tablet. Parameters such as the type of a specimen, an analysis item, a dispensing amount (liquid amount) of the specimen and a reagent according to the analysis item, and the number A (where N>A>N/B+1) of the reaction vessels 2 moved in one cycle or the number of cycles B (where B>2) described above are set in advance by an upper controller (not shown), and are stored in a predetermined storage area of the storage unit 216. The parameters stored in the storage unit 216 may be changed by the user (examination engineer) via the input unit 211. In this case, when the input unit 211 receives a change in the parameter described above, the changed parameter is stored in a predetermined storage area of the storage unit 216 via the input I/F 212 and the internal bus 224. In addition, the number A (where N>A>N/B+1) of the reaction vessels 2 moved in one cycle or the number of cycles B (where B>2) is transferred to the reaction disk rotation control unit 218a via the internal bus 224.

Based on the number A (where N>A>N/B+1) of the reaction vessels 2 moved in one cycle or the number of cycles B (where B>2) transferred via the internal bus 224 and the total number N of the reaction vessels 2 accommodated in the reaction disk 1 which is already known, where the relationship A×B=N×C±1 is satisfied, N and A are mutually prime, and B and C are mutually prime, the reaction disk rotation control unit 218a obtains C and A or B. Here, as in the first embodiment, as an example, the total number N of the reaction vessels 2 accommodated in the reaction disk 1 is 28, and it is obtained that the number A (where N>A>N/B+1) of reaction vessels 2 moved in one cycle is 17, the number of cycles B (where B>2) is 5, and the number of rotations C (where C>1) is 3. The reaction disk rotation control unit 218a divides the number A of the reaction vessels 2 moved in one cycle into two by setting the number A (where N>A>N/B+1) of the reaction vessels 2 moved in one cycle as A=A1+A2. Hereinafter, the case where A1=9 and A2=8 will be described as an example. The reaction disk rotation control unit 218a stores the obtained number A (A=A1+A2) of the reaction vessels 2 moved in one cycle, the number of cycles B, and the number of rotations C in the storage unit 216. In addition, the reaction disk rotation control unit 218a outputs 9 and 8 obtained by dividing 17 which is the obtained number A (where N>A>N/B+1) of the reaction vessels 2 moved in one cycle, that is, outputs a control signal (control command) corresponding to a pitch number 9, to a stepping motor or a pulse motor which rotationally drives the reaction disk 1 via the output I/F 223, and then, outputs a control signal (control command) corresponding to a pitch number 8 to the stepping motor or the pulse motor which rotationally drives the reaction disk 1 via the output I/F 223.

The measured value acquisition unit 213 acquires the measured value of the absorbance measured by the spectrophotometer as the measuring unit 4, performs processing such as AD conversion and/or smoothing (noise removal), and stores the measured value in a predetermined storage area of the storage unit 216 via the internal bus 224.

In addition to the type of the specimen, the analysis item, the dispensing amount (liquid amount) of the specimen and the reagent according to the analysis item, the number A (A=A1+A2) of the reaction vessels 2 moved in one cycle, the number of cycles B and the number of rotations C obtained by reaction disk rotation control unit 218a, and the measured value of absorbance after processing such as the AD conversion and/or the smoothing (noise removal) by the measured value acquisition unit 213 described above, the storage unit 216 stores a calibration curve indicating the relationship between the absorbance set in advance and a concentration value of the analysis item.

The specimen transport mechanism control unit 217 outputs a control signal (control command) to the specimen transport mechanism 17 via the output I/F 223, so that the rack 16, on which a plurality of the specimen vessels 15 accommodating the specimen is mounted, is transported to a position (desired position) where the suction by the specimen dispensing mechanism 11 can be performed.

The specimen dispensing mechanism control unit 214 accesses the storage unit 216, reads the type of the specimen, the analysis item, the dispensing amount (liquid amount) of the specimen according to the analysis item, and outputs a stroke amount of a syringe pump corresponding to the dispensing amount (liquid amount) of the specimen to the specimen pump 18c connected to the specimen dispensing mechanism 11 via the output I/F 223 as the control signal (control command). In addition, the specimen dispensing mechanism control unit 214 performs control so that the specimen nozzle 11a which constitutes the specimen dispensing mechanism 11 is operated to draw a circular arc toward the specimen vessel 15 to suck a predetermined amount of specimen, and then to draw a circular arc toward the reaction vessel 2 to discharge the specimens.

The reagent dispensing mechanism control unit 215 accesses the storage unit 216, reads a dispensing amount (liquid amount) of the first reagent and the second reagent according to the analysis item, and outputs the stroke amount of the syringe pump corresponding to the dispensing amount (liquid amount) of the first reagent and the second reagent to the specimen pump 18a connected to the reagent dispensing mechanism 7 via the output I/F 223 as the control signal (control command). In addition, the reagent dispensing mechanism control unit 215 performs control so that the reagent nozzle 7a which constitutes the reagent dispensing mechanism 7 is operated to draw an circular arc toward the reagent bottle 10 to suck a predetermined amount of the first reagent or the second reagent, and then to draw a circular arc toward the reaction vessel 2 positioned at a first reagent discharge position 53 to discharge the first reagent, and toward the reaction vessel 2 positioned at a second reagent discharge position 54 to discharge the second reagent.

The stirring mechanism control unit 219 outputs a control signal (control command) to the stirring mechanism 5 via the output I/F 223 so as to stir, with a predetermined stirring intensity, a reaction liquid which is the mixture of the specimen and the first reagent, or the reaction liquid which is a mixture of the specimen, the first reagent and the second reagent in the reaction vessel 2 positioned at the first stirring position 55 or the second stirring position 56.

The analysis item concentration calculation unit 221 accesses the storage unit 216 to obtain the concentration value of the analysis item of the specimen based on the measured value of absorbance and the calibration curve, and outputs the obtained concentration value of the analysis item of the specimen to the output unit 222 configured by a display device or a printer.

The cleaning mechanism control unit 220 outputs a drive command to the cleaning pump 20 and the vacuum pump 22 connected to the cleaning mechanism 3 via the output I/F 223 as the control signal, so that the reaction liquid in the reaction vessel 2 accommodating the reaction liquid that has been measured is sucked by the vacuum pump 22, and the reaction vessel 2 is cleaned by the cleaning pump 20.

Next, the operation of the automatic analysis device 100a of the present embodiment will be described with the arrangement of a plurality of reaction vessels 2 accommodated in the reaction disk 1.

As shown in the first embodiment, in FIG. 6, 28 reaction vessels 2-1 to 2-28 are accommodated in the reaction disk 1 while being spaced apart from each other at predetermined intervals along a circumferential direction (circumferentially). Similarly, as shown by an arrow, the reaction disk 1 is repeatedly rotated and stopped by 17 reaction vessels 2 clockwise in one cycle, 17×5=85 for the reaction vessels 2 in five cycles, that is, the total number of reaction vessels 2 which is 28×3 circles+an amount equivalent to one reaction vessel 2=85, and the reaction disk 1 is stopped at a position moving through 3 rotations+an amount equivalent to one reaction vessel 2 after five cycles. However, based on the state shown in FIG. 6, the automatic analysis device 100a stops once after the reaction disk 1 moves by an amount equivalent to 9 (A1) reaction vessels clockwise, and this state is shown in FIG. 7. After that, the reaction disk 1 moves by an amount equivalent to the remained 8 (A2) reaction vessels and stops, and the operation of an amount equivalent to one cycle is completed.

As shown in the upper drawing of FIG. 6, the reagent dispensing mechanism 11 sucks the type of the specimen, the analysis item, the dispensing amount (liquid amount) of the specimen according to the analysis item from the specimen dispensing mechanism control unit 214 which constitutes the controller 21a (FIG. 5) from the specimen vessel 15 or the reaction vessel 2-2 positioned at the specimen suction position 42. When the specimen dispensing mechanism 11 discharges the specimen to the reaction vessel 2-1 positioned (stopped) at the specimen discharge position 41, the reagent dispensing mechanism 7 sucks the reagent from the reagent bottle 10 accommodated in the reagent disk 9, and discharges the reagent to the reaction vessel 2-8 of cycle [8] positioned at the first reagent discharge position 53 and/or the reaction vessel 2-9 of cycle [13] positioned at the second reagent discharge position 54. During this time, the reaction vessel 2-18 of cycle [2] positioned at a first stirring position 55 and/or the reaction vessel 2-19 of cycle [7] positioned (stopped) at a second stirring position 56 are stirred by the stirring mechanism 5 based on a predetermined stirring intensity from the stirring mechanism control unit 219 which constitutes the controller 21a. In addition, as shown in FIG. 4 in the first embodiment described above, assuming that the reaction vessel 2 can be cleaned from cycle [19], as shown by the black circle in the lower drawing of FIG. 6, it is possible to arrange the cleaning mechanism 3 at a position where it is easy to lay out the cleaning mechanism 3 from among cycle [21] and cycle [26], cycle [23] and cycle [28], cycle [20] and cycle [25], cycle [22] and cycle [27], and cycle [19] and cycle [24]. That is, the adjacent positions where the reaction vessel can be cleaned by the cleaning mechanism 3 in two cycles apart by five cycles are substantially uniformly dispersed at B places (five places), so that an installation position of the cleaning mechanism 3 can be selected from the B places (five places), and therefore, it is very advantageous in considering the optimum layout. In the present embodiment, as shown in the upper drawing of FIG. 6, the cleaning mechanism 3 is disposed at the positions of the reaction vessel 2-5 of cycle [21] positioned (stopped) at a cleaning position 61 and the reaction vessel 2-6 of cycle [26] positioned (stopped) at a cleaning position 62, so as to clean the reaction vessel 2-5 and the reaction vessel 2-6.

FIG. 7 shows a state where the reaction disk 1 moves by an amount equivalent to 9 (A1) reaction vessels clockwise and stops based on the control signal (control command) from the reaction disk rotation control unit 218a (FIG. 5) at a stage when the specimen dispensing mechanism 11, the reagent dispensing mechanism 7, the stirring mechanism 5, and the cleaning mechanism 3 finished processing such as dispensing for each reaction vessel 2. In the present embodiment, as in the first embodiment, the reaction vessels 2 are continuously arranged every B cycles (five cycles) in B divided blocks (five divided blocks), so that when the reaction disk 1 stops halfway, the peripheries of the specimen dispensing mechanism 11, the reagent dispensing mechanism 7, the stirring mechanism 5, and the cleaning mechanism 3 can be provided with a reaction vessel which can be newly dispensed, stirred, and cleaned. Specifically, the reaction vessel 2-20 of cycle [12] stops at the specimen discharge position 41, and the reaction vessel 2-21 of cycle [17] stops at the specimen suction position 42. In addition, the reaction vessel 2-19 of cycle [7] stops at a specimen suction position 48 which is next to the specimen suction position 41 in a counterclockwise direction. Therefore, the specimen dispensing mechanism 11 can suck the pretreated specimen from any one of three positions of the specimen discharge position 41, the specimen suction position 42, and the specimen suction position 48, or suck the specimen from the specimen vessel 15, and can discharge the pretreated specimen or the specimen in the specimen vessel 15 to the reaction vessel 2 stopped at the specimen discharge position 41 in the next cycle.

The reagent dispensing mechanism 7 sucks the dispensing amount (liquid amount) of the reagent according to the analysis item from the reagent dispensing mechanism control unit 215 (FIG. 5) from the reagent bottle 10 accommodated in the reagent disk 9, and discharges the reagent to the reaction vessel 2-1 of cycle [1] positioned (stopped) at positioned at a first reagent discharge position 51 and/or the reaction vessel 2-2 of cycle [6] positioned (stopped) at a second reagent discharge position 52 which is further next to the first reagent discharge position 51 clockwise. Here, as apparent from the comparison between the upper drawing of FIG. 6 and the upper drawing of FIG. 7, the first reagent discharge position 51 in the upper drawing of FIG. 7 is positioned clockwise next to the second reagent discharge position 54 in the upper drawing of FIG. 6. The lower drawing of FIG. 7 shows that the reaction disk 1 moves by an amount equivalent to A1 (9) reaction vessels and then stopped once during the reaction disk 1 moving by A (17) reaction vessels 2 in one cycle. For convenience, the number of cycles shown in parentheses is indicated by a dash. However, in the lower drawing of FIG. 6 and the lower drawing of FIG. 7, position numbers of reaction vessels 1 to 28 when the specimen dispensing position is 1 are indicated in the same manner. When the lower drawing of these FIG. 6 and the lower drawing of FIG. 7 are compared, it can be seen that the first reagent dispensing position in the lower drawing of FIG. 7 is positioned clockwise next to the second reagent dispensing position in the lower drawing of FIG. 6.

During this time, the reaction vessel 2-9 of cycle [13] positioned (stopped) at the first stirring position 55 and/or the reaction vessel 2-8 of cycle [8] positioned (stopped) at a second stirring position 57 which is next to the first stirring position 55 in the counterclockwise direction are stirred by the stirring mechanism 5 based on a predetermined stirring intensity from the stirring mechanism control unit 219.

In addition, as shown by the black circles in the lower drawing of FIG. 7, it is possible to arrange a cleaning mechanism 111 at a position where it is easy to lay out the cleaning mechanism from among cycle [22] and cycle [27], cycle [19] and cycle [24], cycle [21] and cycle [26], cycle [23] and cycle [28], and cycle [20] and cycle [25]. In the upper drawing of FIG. 7, the cleaning mechanism 111 is disposed so as to access the reaction vessel 2-22 of cycle [22] positioned (stopped) at a cleaning position 63 and the reaction vessel 2-23 of cycle [27] positioned (stopped) at a cleaning position 64.

The cleaning mechanism 3 shown in FIG. 6 and the cleaning mechanism 111 shown in FIG. 7 may be movable by the same object, or one or both of them may be disposed. In addition, a plurality of cleaning mechanisms may be dispersedly disposed at positions where the reaction vessels 2 can be cleaned shown in FIGS. 6 and 7.

In this way, by rotating the reaction disk 1 twice and stopping for once in one cycle, the suction of specimens, the discharge of the reagent, the stirring of the reagent, and the cleaning can be performed for a plurality of times. In FIGS. 6 and 7, one specimen dispensing mechanism 11, one reagent dispensing mechanism 7, one stirring mechanism 5, and one cleaning mechanism are provided, but a plurality of each kind of mechanisms may be disposed in order to improve the processing capacity and the cleaning power.

As described above, according to the present embodiment, in addition to the effects of the first embodiment, by rotating the divided reaction disk 1 twice and stopping for once in one cycle, the suction of specimens, the discharge of the reagent, the stirring of the reagent, and the cleaning can be performed for a plurality of times.

Third Embodiment

FIG. 8 is a functional block diagram of a controller which constitutes an automatic analysis device according to a third embodiment according to another embodiment of the invention. FIGS. 9 to 11 are diagrams illustrating arrangements of a plurality of reaction vessels accommodated in a reaction disk which constitutes the automatic analysis device of the third embodiment. The present embodiment is different from the first embodiment in that a reaction disk rotation control unit 218$b$ of a control roller 21$b$ which constitutes an automatic analysis device 100$b$ controls the reaction disk 1 such that the reaction disk 1 stops twice when the reaction disk 1 moves by the number A of the reaction vessels 2 in one cycle. Other configurations are the same as those of the first embodiment, and the same components as those in the first embodiment are denoted by the same reference numerals.

As shown in FIG. 8, the controller 21$b$ of the present embodiment includes the input unit 211, the input I/F 212, the measured value acquisition unit 213, the specimen dispensing mechanism control unit 214, the reagent dispensing mechanism control unit 215, the storage unit 216, the specimen transport mechanism control unit 217, the reaction disk rotation control unit 218$b$, the stirring mechanism control unit 219, the cleaning mechanism control unit 220, the analysis item concentration calculation unit 221, the output unit 222, and the output I/F 223. These units are connected to one another via the internal bus 224. The measured value acquisition unit 213, the specimen dispensing mechanism control unit 214, the reagent dispensing mechanism control unit 215, the specimen transport mechanism control unit 217, the reaction disk rotation control unit 218$b$, the stirring mechanism control unit 219, the cleaning mechanism control unit 220, and the analysis item concentration calculation unit 221 are realized by, for example, a processor such as a central processing unit (CPU) (not shown), a ROM storing various programs, a RAM temporarily storing data of calculation process, and a storage device such as an external storage device; and the processor such as the CPU reads and executes various programs stored in the ROM, and stores the calculation result, which is the execution result, in the RAM or the external storage device. In the present embodiment, for convenience of description, the measured value acquisition unit 213, the specimen dispensing mechanism control unit 214, the reagent dispensing mechanism control unit 215, the specimen transport mechanism control unit 217, the reaction disk rotation control unit 218$b$, the stirring mechanism control unit 219, the cleaning mechanism control unit 220, and the analysis item concentration calculation unit 221 are shown indifferent functional books, but a functional block as a control unit of any desired combination of these units may be configured to execute a plurality of programs for realizing each function of the control unit.

The input unit 211 is configured by, for example, a pointing device, a keyboard, or a tablet. Parameters such as the type of a specimen, an analysis item, a dispensing amount (liquid amount) of the specimen and a reagent according to the analysis item, and the number A of the reaction vessels 2 moved in one cycle (where N>A>N/B+1) or the number of cycles B (where B>2) described above are set in advance by an upper controller (not shown), and are stored in a predetermined storage area of the storage unit 216. The parameters stored in the storage unit 216 may be changed by the user (examination engineer) via the input unit 211. In this case, when the input unit 211 receives a change in the parameter described above, the changed parameter is stored in a predetermined storage area of the storage unit 216 via the input I/F 212 and the internal bus 224. In addition, the number A of the reaction vessels 2 moved in one cycle (where N>A>N/B+1) or the number of cycles B (where B>2) is transferred to the reaction disk rotation control unit 218$b$ via the internal bus 224.

Based on the number A (where N>A>N/B+1) of the reaction vessels 2 moved in one cycle or the number of cycles B (where B>2) transferred via the internal bus 224 and the total number N of the reaction vessels 2 accommodated in the reaction disk 1 which is already known, where the relationship A×B=N×C±1 is satisfied, N and A are mutually prime, and B and C are mutually prime, the reaction disk rotation control unit 218$b$ obtains the relationship between C and A or B. Here, as in the first embodiment, as an example, the total number N of the reaction vessels 2 accommodated in the reaction disk 1 is 28, and it is obtained that the number A (where N>A>N/B+1) of reaction vessels 2 moved in one cycle is 17, the number of cycles B (where B>2) is 5, and the number of rotations C (where C>1) is 3. The reaction disk rotation control unit 218$b$ divides the number A of the reaction vessels 2 moved in one cycle into three by setting the number A (where N>A>N/B+1) of the reaction vessels 2 moved in one cycle as A=A1+A2+A3. Hereinafter, the case where A1=9, A2=1, and A3=7 will be described as an example. The reaction disk rotation control unit 218$b$ stores the number A (A=A1+A2+A3) of the reaction vessels 2 moved in one cycle, the number of cycles B, and the number of rotations C in the storage unit 216. In addition, the reaction disk rotation control unit 218$b$ outputs 9, 1, and 7 obtained by dividing 17 which is the number A (where N>A>N/B+1) of the reaction vessels 2 moved in one cycle, that is, outputs a control signal (control command) corresponding to a pitch number 9, to a stepping motor or a pulse motor which rotationally drives the reaction disk 1 via the output I/F 223, and then outputs a control signal (control command) corresponding to a pitch number 1 to the stepping motor or the pulse motor which rotationally drives the reaction disk 1 via the output I/F 223, and further outputs a control signal (control command) corresponding to a pitch number 7 to the stepping motor or the pulse motor which rotationally drives the reaction disk 1 via the output I/F 223.

The measured value acquisition unit 213 acquires the measured value of the absorbance measured by the spectrophotometer as the measuring unit 4, performs processing such as AD conversion and/or smoothing (noise removal), and stores the measured value in a predetermined storage area of the storage unit 216 via the internal bus 224.

In addition to the type of the specimen, the analysis item, the dispensing amount (liquid amount) of the specimen and the reagent according to the analysis item, the number A (A=A1+A2+A3) of the reaction vessels 2 moved in one cycle, the number of cycles B and the number of rotations C obtained by reaction disk rotation control unit 218*b*, and the measured value of absorbance after processing such as the AD conversion and/or the smoothing (noise removal) by the measured value acquisition unit 213 described above, the storage unit 216 stores a calibration curve showing the relationship between the absorbance set in advance and a concentration value of the analysis item.

The specimen transport mechanism control unit 217 outputs a control signal (control command) to the specimen transport mechanism. 17 via the output I/F 223, so that the rack 16, on which a plurality of the specimen vessels 15 accommodating the specimen is mounted, is transported to a position (desired position) where the suction by the specimen dispensing mechanism 11 can be performed.

The specimen dispensing mechanism control unit 214 accesses the storage unit 216, reads the type of the specimen, the analysis item, the dispensing amount (liquid amount) of the specimen according to the analysis item, and outputs a stroke amount of a syringe pump corresponding to the dispensing amount (liquid amount) of the specimen to the specimen pump 18*c* connected to the specimen dispensing mechanism 11 via the output I/F 223 as the control signal (control command). In addition, the specimen dispensing mechanism control unit 214 performs control so that after the specimen nozzle 11*a* which constitutes the specimen dispensing mechanism 11 is operated to draw a circular arc toward the specimen vessel 15 to suck a predetermined amount of specimen, and then to draw a circular arc toward the reaction vessel 2 to discharge the specimens.

The reagent dispensing mechanism control unit 215 accesses the storage unit 216, reads a dispensing amount (liquid amount) of the first reagent, the second reagent, and a third reagent according to the analysis item, and outputs a stroke amount of the syringe pump corresponding to the dispensing amount (liquid amount) of the first reagent, the second reagent, and the third reagent to the specimen pump 18*a* connected to the reagent dispensing mechanism 7 via the output I/F 223 as the control signal (control command). In addition, the reagent dispensing mechanism control unit 215 performs control so that the reagent nozzle 7*a* which constitutes the reagent dispensing mechanism 7 is operated to draw an circular arc toward the reagent bottle 10 to suck a predetermined amount of the first reagent, the second reagent, and the third reagent, and then to draw a circular arc toward the reaction vessel 2 positioned at a first reagent discharge position 71 to discharge the first reagent, toward the reaction vessel 2 positioned at a second reagent discharge position 72 to discharge the second reagent, and toward the reaction vessel 2 positioned at a third reagent discharge position 73 to discharge the third reagent.

The stirring mechanism control unit 219 outputs a control signal (control command) to a stirring mechanism 115 via the output I/F 223 so as to stir a reaction liquid in the reaction vessel 2 positioned at a stirring position 75 with a predetermined stirring intensity.

The analysis item concentration calculation unit 221 accesses the storage unit 216 to obtain the concentration value of the analysis item of the specimen based on the measured value of absorbance and the calibration curve, and outputs the obtained concentration value of the analysis item of the specimen to the output unit 222 configured by a display device or a printer.

The cleaning mechanism control unit 220 outputs a drive command to the cleaning pump 20 and the vacuum pump 22 connected to the cleaning mechanism 3, the cleaning mechanism 111, and the cleaning mechanism 112 via the output I/F 223 as the control signal, so that the reaction liquid in the reaction vessel 2 accommodating the reaction liquid that has been measured is sucked by the vacuum pump 22, and the reaction vessel 2 is cleaned by the cleaning pump 20.

Next, the operation of the automatic analysis device 100*b* of the present embodiment will be described with the arrangement of a plurality of reaction vessels 2 accommodated in the reaction disk 1.

As shown in the first embodiment, in FIG. 9, 28 reaction vessels 2-1 to 2-28 are accommodated in the reaction disk 1 while being spaced apart from each other at predetermined intervals along a circumferential direction (circumferentially). Similarly, as shown by an arrow, the reaction disk 1 is repeatedly rotated and stopped by 17 reaction vessels 2 clockwise in one cycle, 17×5=85 for the reaction vessels 2 in five cycles, that is, the total number of reaction vessels 2 which is 28×3 circles+an amount equivalent to one reaction vessel 2=85, and the reaction disk 1 is stopped at a position moving through 3 rotations+an amount equivalent to one reaction vessel 2 after five cycles. However, based on the state shown in FIG. 9, the automatic analysis device 100*b* stops once after the reaction disk 1 moves by an amount equivalent to 9 (A1) reaction vessels clockwise, and this state is shown in FIG. 10. After that, the reaction disk 1 moves by an amount equivalent to 1 (A2) reaction vessel clockwise and stops, and this state is shown in FIG. 11. Further, after that, the reaction disk 1 moves by an amount equivalent to 7 (A3) reaction vessels and stops, and the operation of one cycle is completed. As shown in FIG. 9, the reaction vessels 2 on the reaction disk 1 is divided into B (divided into 5) based on stop positions of the reaction vessel of cycle [1] to cycle [5], and the reaction vessels 2 are arranged adjacently in a clockwise direction by every B cycles (B=5) from the reaction vessels of cycles [1] to [5]. There are a first block 101 starts from cycle [1], a second block 102 starts from cycle [2], a third block 103 starts from cycle [3], a fourth block 104 starts from cycle [4], and a fifth block 105 starts from cycle [5].

As shown in FIG. 9, the reagent dispensing mechanism 11 sucks the type of the specimen, the analysis item, the dispensing amount (liquid amount) of the specimen according to the analysis item from the specimen dispensing mechanism control unit 214 (FIG. 8) from the specimen vessel 15 or the reaction vessel 2-2 positioned (stopped) at the specimen suction position 42. When the specimen dispensing mechanism 11 discharges the sucked specimen to the reaction vessel 2-1 positioned (stopped) at the specimen discharge position 41, the stirring mechanism 115 is positioned at a stirring position 75 separated from the specimen discharge position 41 by 17 (A) reaction vessels which is a moving distance in one cycle of the reaction disk 1 clockwise in a rotational direction of the reaction disk 1, and stirs the reaction vessel 2-18 of cycle [2] in which the first reagent is dispensed in the previous cycle at this position. The stirring mechanism 115 in the present embodiment takes a fixed form in which the reaction liquid, which is a mixture of the specimen and the reagent in the reaction vessel 2, is stirred in a noncontact manner by an acoustic wave transmitted by an ultrasonic element, and the reaction liquid is only stirred at the stirring position 75.

As shown in FIG. 9, the reagent dispensing mechanism 7 sucks the second reagent from the reagent bottle 10 accommodated in the reagent disk 9 and discharges the second reagent to the reaction vessel 2-8 of cycle [8] positioned (stopped) at the second reagent discharge position 72, or sucks the third reagent from the reagent bottle 10 and discharges the third reagent to the reaction vessel 2-9 of cycle [13] positioned (stopped) at the third reagent discharge position 73. The second reagent discharge position 72 and the third reagent discharge position 73 are positioned in the third block 103, which is different from the first block 101 in which the specimen discharge position 41 is positioned, or the fifth block 105 in which the stirring mechanism 115 is positioned, which are blocks between the first block 101 and the fifth block 105 in the clockwise direction, which is the rotational direction of the reaction disk 1. That is, the second reagent discharge position 72 and the third reagent discharge position 73 are positioned near a substantial center between the specimen discharge position 41 and a reagent stirring position 75. In addition, as shown in FIG. 4 in the first embodiment described above, assuming that the reaction vessel 2 can be cleaned from cycle [19], it is possible to arrange the cleaning mechanism 3 at a position where it is easy to lay out the cleaning mechanism 3 from among cycle [21] and cycle [26] in the first block 101, cycle [23] and cycle [28] in the third block 103, cycle [20] and cycle [25] in the fifth block 105, cycle [22] and cycle [27] in the second block 102, and cycle [19] and cycle [24] in the fourth block 104. In the example shown in FIG. 9, the cleaning mechanism 3 cleans the reaction vessel 2-5 of cycle [21] positioned (stopped) at the cleaning position 61 and cleans the reaction vessel 2-6 of cycle [26] positioned (stopped) at the cleaning position 62.

FIG. 10 shows a state where the reaction disk 1 moves by an amount equivalent to 9 (A1) reaction vessels and stops based on the control signal (control command) from the reaction disk rotation control unit 218b (FIG. 8) at the stage when the specimen dispensing mechanism 11, the reagent dispensing mechanism 7, the stirring mechanism 5, and the cleaning mechanism 3 finished processing such as dispensing for each reaction vessel 2. The reaction vessel 2-9 of cycle [13] positioned (stopped) at the third reagent discharge position 73 close to the stirring position 75 stops at the stirring position 75 by moving by the amount equivalent to 9 (A1) reaction vessels. Here, when the reagent is added to the reaction vessel 2-9 of cycle [13], the reaction liquid, which is the mixture of the specimen and the reagent, is stirred by the stirring mechanism 115 based on a predetermined stirring intensity from the stirring mechanism control unit 219. The reagent dispensing mechanism 7 sucks the reagent from the reagent bottle 10 accommodated in the reagent disk 9, and discharges the reagent to the reaction vessel 2-1 of cycle [1] positioned (stopped) at the first reagent discharge position 71. As shown in FIG. 9, the second reagent discharge position 72 and the third reagent discharge position 73 are positioned near a substantial center between the specimen discharge position 41 and the stirring position 75, and therefore the moving amount of the reaction disk 1 from the second reagent discharge position 72 and the third reagent discharge position 73 to the stirring position 75 is approximately half the moving distance of the reaction disk 1 in one cycle. That is, since the reaction vessel 2-1, to which the specimen is dispensed by the specimen dispensing mechanism 11, inevitably stops near the second reagent discharge position 72 and the third reagent discharge position 73, it is possible to easily access the first reagent discharge position 71 and discharge the reagent by using the reagent dispensing mechanism 7 having an articulated robot arm such as an XY movement mechanism or a θ-θ mechanism, and without using a plurality of reagent dispensing mechanisms.

In FIG. 10, the reaction vessel 2-20 of cycle [12] is positioned (stopped) at the specimen discharge position 41, the reaction vessel 2-21 of cycle [17] is positioned (stopped) at the specimen suction position 42, and the reaction vessel 2-19 of cycle [7] is positioned (stopped) at the specimen suction position 48 which is next to the specimen suction position 41 in a counterclockwise direction. Therefore, the specimen dispensing mechanism 11 can suck the pretreated specimen from any one of three positions of the specimen discharge position 41, the specimen suction position 42, and the specimen suction position 48, or suck the specimen from the specimen vessel 15, and can discharge the pretreated specimen or the specimen in the specimen vessel 15 at the specimen discharge position 41 in the next cycle.

It is possible to arrange the cleaning mechanism 111 at a position where it is easy to lay out the cleaning mechanism from among cycle [21] and cycle [26] in the first block 101, cycle [23] and cycle [28] in the third block 103, cycle [20] and cycle [25] in the fifth block 105, cycle [22] and cycle [27] in the second block 102, and cycle [19] and cycle [24] in the fourth block 104. In FIG. 10, the cleaning mechanism 111 is disposed so as to clean the reaction vessel 2-22 of cycle [22] positioned (stopped) at the cleaning position 63 and the reaction vessel 2-23 of cycle [27] positioned (stopped) at the cleaning position 64.

FIG. 11 shows a state where the reaction disk 1 moves by an amount equivalent to one (A2) reaction vessel and stops based on the control signal (control command) from the reaction disk rotation control unit 218b (FIG. 8) at the stage when the specimen dispensing mechanism 11, the reagent dispensing mechanism 7, the stirring mechanism 115, and the cleaning mechanism 111 (FIG. 10) finished processing such as dispensing for each reaction vessel 2. The reaction vessel 2-8 of cycle [8] (FIG. 9), to which the reagent is dispensed at the second reagent discharge position 72 farther than the third reagent discharge position 73 with respect to the stirring position 75, stops at the stirring position 75 by moving the reaction disk 1 by the amount equivalent to one (A2) reaction vessel clockwise. Here, when the reagent is added to the reaction vessel 2-8 of cycle [8], the reaction liquid, which is the mixture of the specimen and the reagent, is stirred by the stirring mechanism 115 based on a predetermined stirring intensity from the stirring mechanism control unit 219.

When the reagent dispensing mechanism 7 is more convenient to discharge the first reagent to the reagent discharge position 76 at which the reaction vessel 2-1 of cycle [1] is positioned (stopped) than to the first reagent discharge position 71 in FIG. 10, instead of the timing of FIG. 10, the reagent may be sucked from the reagent bottle 10 accommodated in the reagent disk 9, and the sucked reagent may be discharged to the reaction vessel 2-1 positioned (stopped) at the reagent discharge position 76 of FIG. 11. The reaction vessel 2-19 of cycle [7] is positioned (stopped) at the specimen discharge position 41, the reaction vessel 2-20 of cycle [12] is positioned (stopped) at the specimen suction position 42, and the reaction vessel 2-18 of cycle [2] is positioned (stopped) at the specimen suction position 48 which is next to the specimen suction position 41 in the counterclockwise direction. Therefore, in the state of FIG. 10, when the specimen is not sucked, the specimen dispensing mechanism 11 can suck the pretreated specimen from any one of three positions of the specimen discharge position 41, the specimen suction position 42, and the specimen suction position 48, or suck the specimen from the specimen vessel 15, and can discharge the pretreated specimen or the specimen in the specimen vessel 15 at the specimen discharge position 41 in the next cycle.

It is possible to arrange a cleaning mechanism 112 at a position where it is easy to lay out the cleaning mechanism 112 from among cycle [21] and cycle [26] in the first block 101, cycle [23] and cycle [28] in the third block 103, cycle [20] and cycle [25] in the fifth block 105, cycle [22] and cycle [27] in the second block 102, and cycle [19] and cycle [24] in the fourth block 104. In FIG. 11, the cleaning mechanism 112 is disposed so as to clean the reaction vessel 2-22 of cycle [22] positioned (stopped) at a cleaning position 65 and the reaction vessel 2-23 of cycle [27] positioned (stopped) at a cleaning position 66.

The cleaning mechanism 3 shown in FIG. 9, the cleaning mechanism 111 shown in FIG. 10, and the cleaning mechanism 112 shown in FIG. 11 may be movable by the same object, or one or two or all of them may be disposed. In addition, a plurality of cleaning mechanisms may be dispersedly disposed at positions where the reaction vessels 2 can be cleaned shown in FIGS. 9, 10, and 11.

In the present embodiment, since one stirring mechanism 115 is provided, measurement time and unit layout can be optimized when the reaction liquid which is the mixture of the specimen and the reagent is stirred at only one position.

As described above, according to the present embodiment, in addition to the effects of the first embodiment, the measurement time of the reaction vessel can be freely set by the minimum mechanism, and the freedom of the device configuration can be optimized.

The invention is not limited to the embodiments described above, and includes various modifications. For example, the embodiments described above are described in detail for easy understanding of the invention, and the invention is not necessarily limited to those including all the configurations described above. In addition, a part of the configuration of a certain embodiment can be replaced with the configuration of another embodiment, and the configuration of another embodiment can be added to the configuration of a certain embodiment.

REFERENCE SIGN LIST

1: reaction disk
2: reaction vessel
2-1 to 2-28: reaction vessel
3, 111, 112: cleaning mechanism
4: measuring unit
5, 115: stirring mechanism
7: reagent dispensing mechanism
7a: reagent nozzle
9: reagent disk
10: reagent bottle
11: specimen dispensing mechanism
11a: specimen nozzle
13, 30, 32: cleaning tank
15: specimen vessel
16: rack
17: specimen transport mechanism
18a: reagent pump
18c: specimen pump
20: cleaning pump
21, 21a, 21b: controller
22: vacuum pump
41: specimen discharge position
42, 48: specimen suction position
43, 51, 53, 71: first reagent dispensing position
44, 52, 54, 72: second reagent dispensing position
45, 55: first stirring position
46, 56, 57: second stirring position
47: absorbance measurement position
61, 62, 63, 64, 65, 66: cleaning position
73: third reagent discharge position
75: stirring position
76: reagent discharge position
100, 100a, 100b: automatic analysis device
101: first block
102: second block
103: third block
104: fourth block
105: fifth block
211: input unit
212: input I/F
213: measured value acquisition unit
214: specimen dispensing mechanism control unit
215: reagent dispensing mechanism control unit
216: storage unit
217: specimen transport mechanism control unit
218, 218a, 218b: reaction disk rotation control unit
219: stirring mechanism control unit
220: cleaning mechanism control unit
221: analysis item concentration calculation unit
222: output unit
223: output I/F
224: internal bus

The invention claimed is:

1. An automatic analysis device, comprising:
a reaction disk which accommodates a plurality of reaction vessels each capable of accommodating a dispensed specimen and reagent, the reaction disk being constructed such that each of the plurality of reaction vessels is arranged to be spaced apart from one another at predetermined intervals circumferentially;
a specimen dispensing mechanism which dispenses a predetermined amount of the specimen into one of said plurality of reaction vessels;
a reagent dispensing mechanism which dispenses a predetermined amount of the reagent into said one reaction vessel;
a measuring unit which measures a reaction liquid during a reaction process and/or after reaction of a mixture of the specimen and the reagent in said one reaction vessel;
a cleaning mechanism which cleans said one reaction vessel after measurement; and
a controller configured to drive the reaction disk such that in one cycle, the plurality of reaction vessels moves by an amount A in a circumferential direction in such a way that N and A are mutually prime, B and C are mutually prime, and N is a total number of the plurality of reaction vessels accommodated in the reaction disk, the reaction disk moves through C (where C>1) rotations+an amount equivalent to one reaction vessel position after B (where B>2) cycles, and the number of reaction vessel positions moved in one cycle is A (where N>A>N/B+1), each said reaction vessel on the reaction disk is divided into B places based on a stop position of an arbitrary one of said plurality of reaction vessels, and each said reaction vessel moves from a first reaction vessel position in the first cycle to the B cycle to an adjacent reaction vessel position respectively, so that the plurality of reaction vessels moves by the amount A in the circumferential direction in said one cycle so that each of the plurality of reaction vessels is arranged adjacent to another one of said plurality of reactions vessels, and the plurality of reaction vessels is arranged circumferentially in order in the reaction disk.

2. The automatic analysis device according to claim 1, wherein
each of a plurality of adjacent positions where one said reaction vessel can be cleaned by the cleaning mechanism is spaced apart by B cycles, and positions of each of the plurality of reaction vessels is uniformly dispersed at B reaction vessel places.

3. The automatic analysis device according to claim 2, wherein
the controller is further configured to drive the reaction disk such that in one cycle, the plurality of reaction vessels moves by an amount A (where N>A>N/B+1) in a circumferential direction, and a relationship A×B=N×C±1 holds, where N is a total number of said plurality of reaction vessels accommodated in the reaction disk.

4. The automatic analysis device according to claim 3, wherein
the controller is further configured to divide the number A (where N>A>N/B+1) of reaction vessels moved in one cycle into two as A=A1+A2, such that A1 reaction vessels are rotationally driven in a circumferential direction and stopped, and then A2 reaction vessels are rotationally driven in the circumferential direction and stopped in one cycle.

5. The automatic analysis device according to claim 3, wherein
the controller is further configured to divide the number A (where N>A>N/B+1) of reaction vessels moved in one cycle into three as A=A1+A2+A3 (where A1>A3>A2), such that A1 reaction vessels are rotationally driven in a circumferential direction and stopped, and then A2 reaction vessels are rotationally driven in the circumferential direction and stopped, and further A3 reaction vessels are rotationally driven in the circumferential direction and stopped in one cycle.

6. The automatic analysis device according to claim 3, wherein
each said reaction disk has at least two or more reagent dispensing places for dispensing of the predetermined amount of the reagent by the reagent dispensing mechanism.

7. The automatic analysis device according to claim 3, wherein
the stirring mechanism is disposed at a position where the reaction disk is moved through the amount A of reaction vessels in the circumferential direction in one cycle from a specimen dispensing position by the specimen dispensing mechanism of the reaction disk.

8. The automatic analysis device according to claim 3, wherein
with respect to one of said plurality of reaction vessels disposed at a specimen dispensing position by the specimen dispensing mechanism of the reaction disk, every time the reaction disk moves for B cycles in the circumferential direction, a position of said one reaction vessel in the reaction disk is moved forward or backward by one reaction vessel position along a moving direction.

9. The automatic analysis device according to claim 4, wherein
with respect to one of said plurality of reaction vessels disposed at a specimen dispensing position by the specimen dispensing mechanism of the reaction disk, after A1 reaction vessels are rotationally driven in the circumferential direction and stopped by the reaction disk, said one reaction vessel is at a position where a predetermined amount of reagent is capable of being dispensed into said one reaction vessel by the reagent dispensing mechanism.

10. The automatic analysis device according to claim 5, wherein
with respect to one of said plurality of reaction vessels disposed at a specimen dispensing position by the specimen dispensing mechanism of the reaction disk, after A1 reaction vessels are rotationally driven by the reaction disk in the circumferential direction and stopped, said one reaction vessel is at a first reagent dispensing position where a predetermined amount of reagent is capable of being dispensed by the reagent dispensing mechanism into said one reaction vessel; and after A2 reaction vessels are rotationally driven in the circumferential direction and stopped by the reaction disk, said one reaction vessel is at a second reagent dispensing position where a predetermined amount of reagent is capable of being dispensed into said one reaction vessel by the reagent dispensing mechanism.

* * * * *